United States Patent
Garrett et al.

(10) Patent No.: US 10,823,163 B1
(45) Date of Patent: Nov. 3, 2020

(54) AIR PUMPS WITH MULTIPLE RESERVOIR HOUSING PORTIONS

(71) Applicants: Jonathon Piel Garrett, San Diego, CA (US); James Aloysius Garrett, San Diego, CA (US)

(72) Inventors: Jonathon Piel Garrett, San Diego, CA (US); James Aloysius Garrett, San Diego, CA (US)

( * ) Notice: Subject to any disclaimer, the term of this patent is extended or adjusted under 35 U.S.C. 154(b) by 25 days.

(21) Appl. No.: 16/434,219

(22) Filed: Jun. 7, 2019

(51) Int. Cl.
| | |
|---|---|
| *F04B 33/00* | (2006.01) |
| *F16J 1/12* | (2006.01) |
| *F16J 13/00* | (2006.01) |
| *F16J 10/02* | (2006.01) |
| *F15B 21/00* | (2006.01) |
| *F04B 39/14* | (2006.01) |

(52) U.S. Cl.
CPC ............ *F04B 33/005* (2013.01); *F04B 39/14* (2013.01); *F15B 21/003* (2013.01); *F16J 1/12* (2013.01); *F16J 10/02* (2013.01); *F16J 13/00* (2013.01)

(58) Field of Classification Search
CPC .......... F04B 9/14; F04B 33/00; F04B 33/005; F04B 39/14; F04B 53/22; F16J 10/02; F16J 13/00; F16J 13/02; F15B 15/1428; F15B 15/1438; F15B 21/003
See application file for complete search history.

(56) References Cited

U.S. PATENT DOCUMENTS

| | | | | |
|---|---|---|---|---|
| 1,476,858 A | * | 12/1923 | Vandeberg ............ | F04B 33/005 417/254 |
| 1,550,363 A | * | 8/1925 | Johnson ................ | F04B 33/005 417/254 |
| 1,624,209 A | * | 4/1927 | Brown .................. | F04B 33/005 92/194 |
| 4,334,839 A | * | 6/1982 | Flagg ..................... | F04B 33/00 417/536 |
| 5,507,626 A | * | 4/1996 | Yang ..................... | F04B 33/005 417/258 |
| 5,823,754 A | | 10/1998 | Lee | |
| 5,873,705 A | * | 2/1999 | Chen ..................... | F04B 33/005 417/259 |
| 6,299,420 B1 | | 10/2001 | Saputo | |
| 6,978,711 B1 | * | 12/2005 | Van der Blom ...... | F04B 33/005 92/6 R |
| 7,421,939 B2 | * | 9/2008 | Van Der Blom ........ | F16J 10/02 92/6 R |
| 8,272,316 B2 | * | 9/2012 | van der Blom ....... | F04B 33/005 92/169.1 |
| 9,194,385 B1 | * | 11/2015 | Dooley ................. | F04B 33/005 |
| 10,508,646 B2 | * | 12/2019 | Tsai ..................... | F04B 33/005 |
| 2012/0097275 A1 | | 4/2012 | Yang | |

* cited by examiner

*Primary Examiner* — Michael Leslie
(74) *Attorney, Agent, or Firm* — Kyle M. Pendergrass

(57) ABSTRACT

Air pumps having an assembled configuration and a disassembled configuration. Particular embodiments described herein include air pumps with a reservoir housing that comprises two or more reservoir housing portions. Each reservoir housing portion couples to another reservoir housing portion in the assembled configuration and decouples from that reservoir housing portion in the disassembled configuration to provide for improved storage of the air pump when not in use.

10 Claims, 25 Drawing Sheets

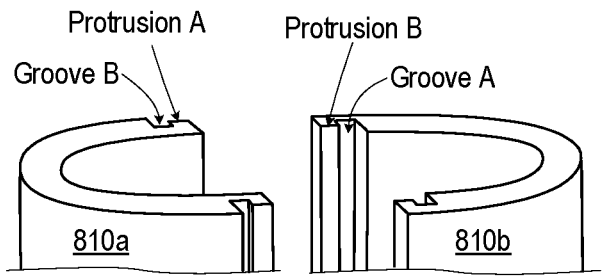
FIG. 8A (unassembled)
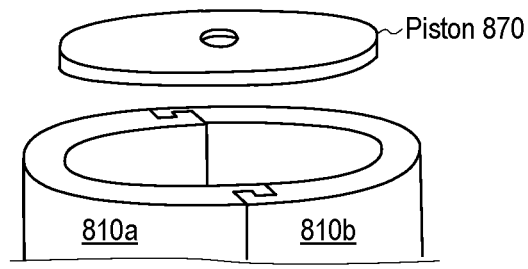
FIG. 8B (assembled)
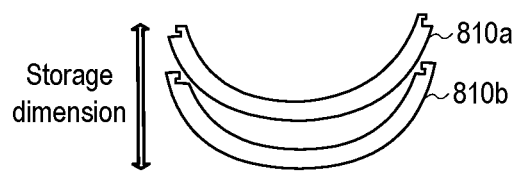
FIG. 8C (nested for storage)

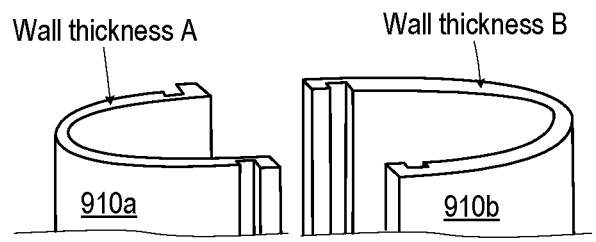
FIG. 9A (unassembled)
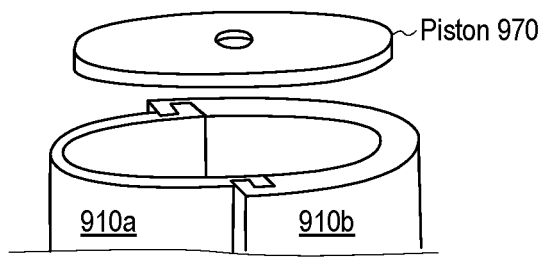
FIG. 9B (assembled)
FIG. 9C (nested for storage)

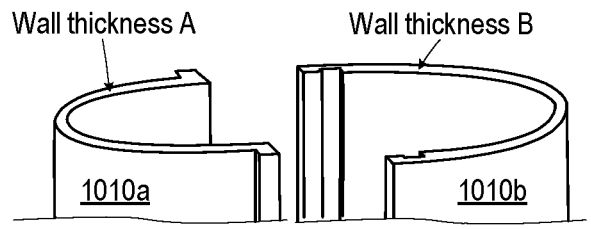
FIG. 10A (unassembled)
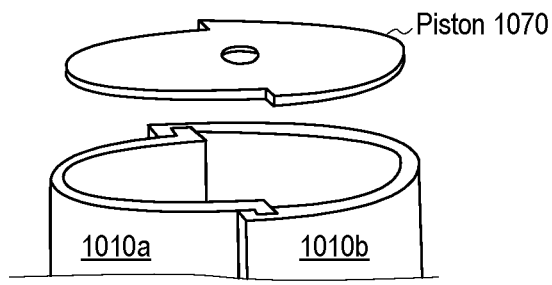
FIG. 10B (assembled)
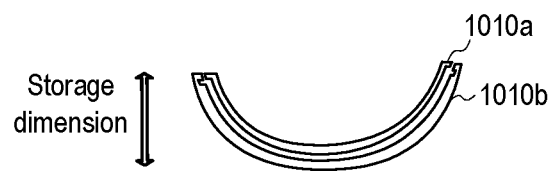
FIG. 10C (nested for storage)

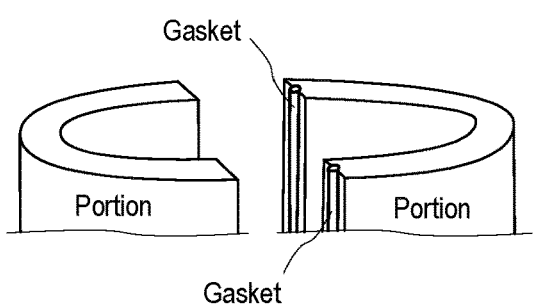
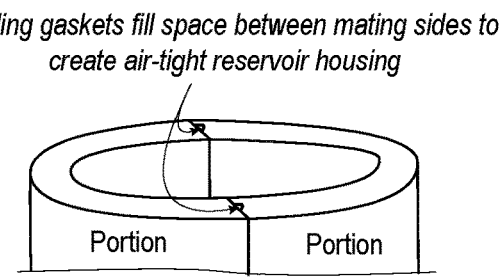
FIG. 13A
(Separated)
FIG. 13B
(Joined)
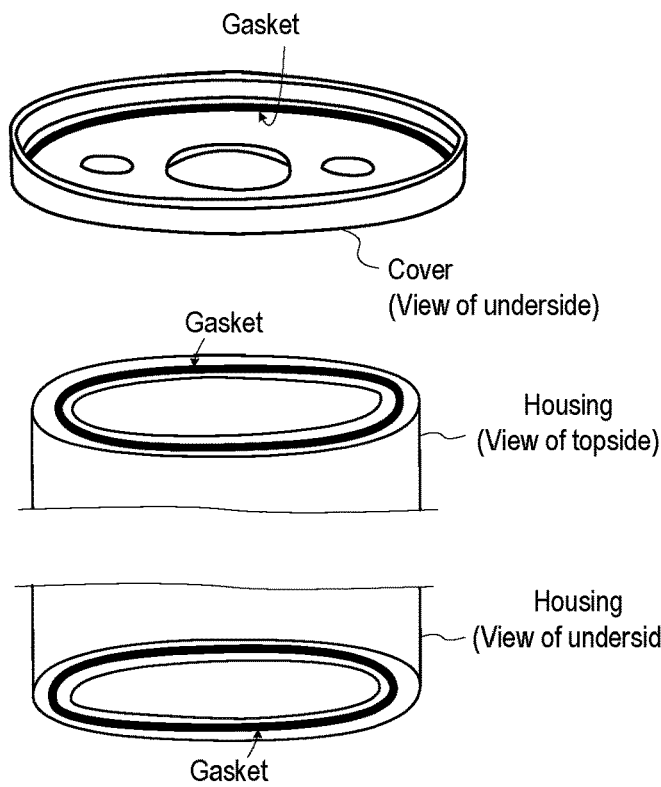
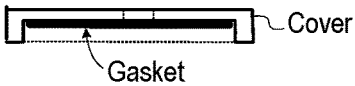
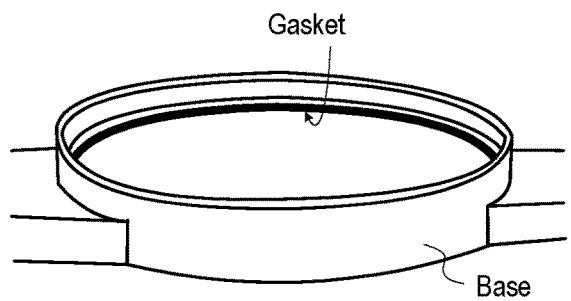
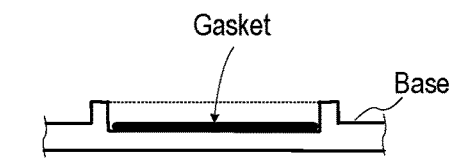
FIG. 14A
(Perspective View)
FIG. 14B
(Cross-sectional Side View)

(Assembled, cross-sectional view)

(Disassembled version 1)

(Disassembled, interior view)

(Disassembled version 2)

(Disassembled)

(Assembled)

(Disassembled)

(Assembled)

(Disassembled)

(Assembled)

*Typical air pump (singular housing)*
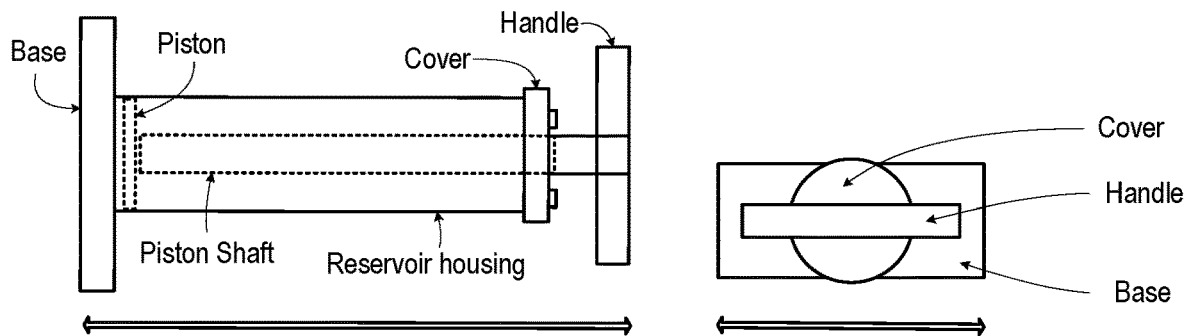
*Unassembled air pump (vertically coupled housing portions and piston shaft portions)*
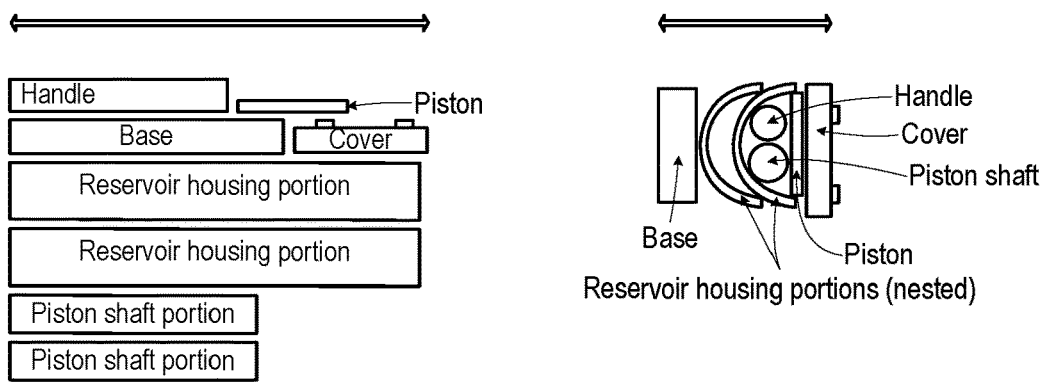
*Unassembled air pump (horizontally coupled housing portions and piston shaft portions)*
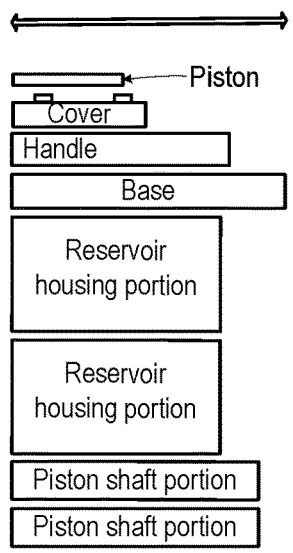
*Unassembled air pump (telescoping housing portions and horizontally piston shaft portions)*
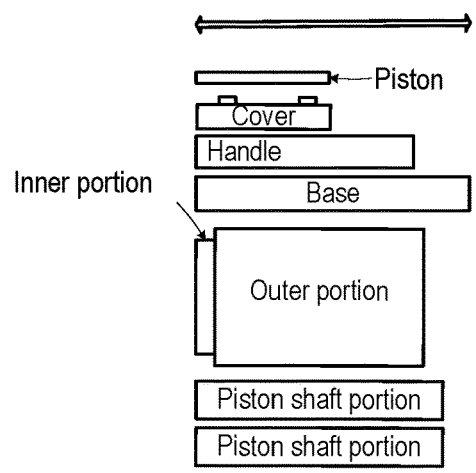
FIG. 19

US 10,823,163 B1

AIR PUMPS WITH MULTIPLE RESERVOIR HOUSING PORTIONS

BACKGROUND

Air pumps have many uses in recreational sporting activities. In particular, kite surfers use air pumps to inflate their kites. Air pumps used in kite surfing have large air reservoirs that enable quick inflation of kites. As a consequence, air pumps that are used for kite surfing occupy significant space when not in use, which results in difficult or awkward storage of air pumps before and after use. The size of kite surfing air pumps is particularly problematic for kite surfers who travel to kite surfing destinations and have limited luggage space. When luggage space that would be occupied by an air pump is too significant, a kite surfer is forced to leave his or her air pump at home, and must purchase or rent another air pump at the kite surfing travel destination for use only at that kite surfing destination. These circumstances can be avoided by using the improved air pumps described herein, which can be used in kite surfing and many other activities that require inflation of things—e.g., floatation devices like rafts, bike tires, and many other things.

BRIEF DESCRIPTION OF THE DRAWINGS

FIG. 8A-10C show examples of different coupling means for joining vertically cut reservoir housing portions of an air pump, and further shows variations to shapes of pistons for use with the different coupling means.

FIG. 13A-14B show examples of sealing means for creating a reservoir volume in an assembled configuration of an air pump using multiple portions of a reservoir housing.

FIG. 19 compares storage profiles for different disassembled air pumps.

DETAILED DESCRIPTION

Figure 1A:
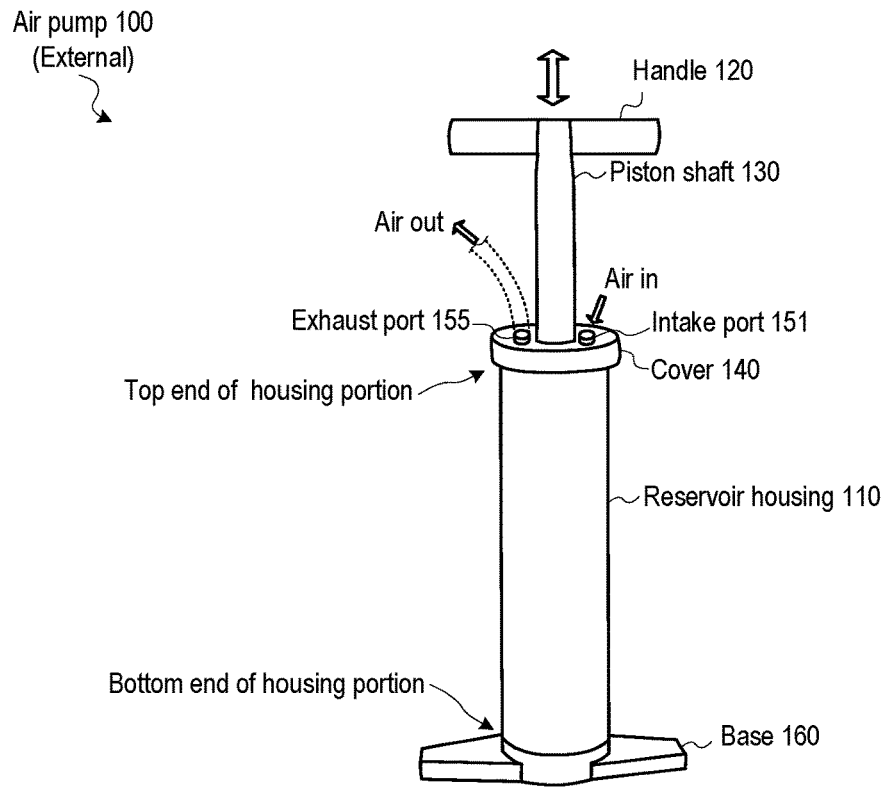
FIG. 1A-1B depict an air pump for delivering air to an inflatable item.
Figure 1B:
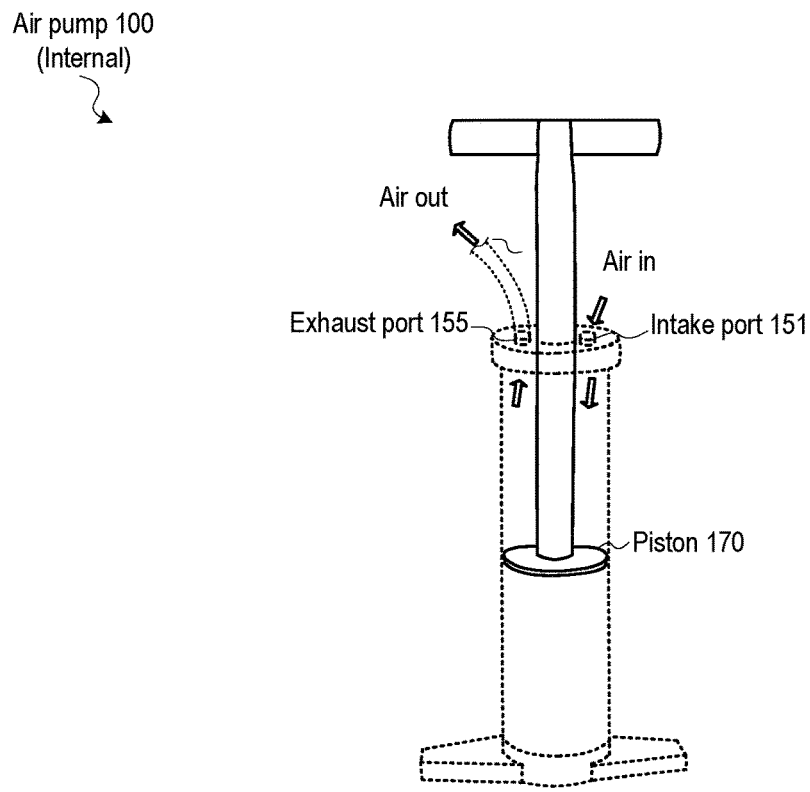

FIG. 1A and FIG. 1B depict an air pump 100. The pump 100 is illustrated as a single-action pump, but aspects described herein are not limited to single-action pumps. Indeed, aspects described herein apply to multiple-action pumps with any air valve configuration.

The pump 100 of includes a reservoir housing 110, and a handle 120 attached to one end of a piston shaft 130 that is partially enclosed within the reservoir housing 110. The handle 120 and the piston shaft 130 may be two separate components or may form an integral component. A top end of the reservoir housing 110 is coupled to a cover 140, and a bottom end of the reservoir housing 110 is coupled to a base 160. The reservoir housing 110, the cover 140, and the base 160 create a reservoir. The coupling of the reservoir housing 110 and the cover 140, and the coupling of the reservoir housing 110 and the base 160, are designed to be sealed (e.g., as air-tight as possible given possible manufacturing imperfections). Different means for coupling reservoir housings to covers and bases are discussed later in this disclosure.

The cover 140 includes a hole through which the piston shaft 130 passes into the reservoir housing 110. A sealing gasket (not shown) may be used to create a seal between the piston shaft 130 and the diameter of the hole in cover 140 to limit air escaping from the reservoir, through the hole, and into the environment around the air pump. Intake and exhaust ports (e.g., valves) 151 and 155 are shown on the cover 140. As known in the art, the intake port 151 and the exhaust port 155 can have different locations in different embodiments (e.g., integral with or coupled to the reservoir housing 110, the piston shaft 130, the cover 140, the base 160, or a combination of the preceding components). As shown in FIG. 1B, a piston 170 is coupled to another end of the piston shaft 130. The shape of the piston matches a cross sectional surface area of a three-dimensional volume inside the reservoir housing 110. As is well-understood in the art, downward and upward movement of the piston 170 within the reservoir housing 110 pulls air in through the intake port 151 and pushes air out of the exhaust port 155. The shape of any reservoir housing described herein can be varied in different embodiments to form different volumetric reservoirs, including a cylinder, a rectangular prism, triangular prism, or any other polygonal volume. The piston is formed to span across a lateral, internal dimension of the reservoir housing. The cover and base are formed to fit around a lateral, outer dimension of the reservoir housing.

The air pump 100 is not without its flaws. For example, the air pump 100 is not manufactured to be disassembled for storage when not in use, and its size awkwardly occupies significant space when not in use. It follows that improved air pumps that overcome these flaws are desirable. Improved air pumps described herein include air pumps that have two configurations—e.g., as assembled configuration and a disassembled configuration. Such air pumps can be disassembled so their components can be more tightly stored when the air pump is not in use.

One improved air pump includes all of the components of the air pump 100, and can be stored more compactly when disassembled than when assembled. Still, the reservoir housing of that improved air pump occupies more space than necessary. Other improved air pumps described herein further reduce their storage footprint by separating the reservoir housing into two or more multiple portions that assemble together when the air pump is in use, and those portions disassemble from each other when the air pump is not in use. Use of a reservoir housing that has multiple portions advantageously allows an air pump to be disassembled, and then more-compactly stored compared to air pumps that use a one-piece reservoir housing. The more-compact storage is desirable for different reasons. In particular, an air pump with a multi-portion reservoir housing occupies less space in travel bags or other storage containers, and is easier to pack compared to air pumps with a one-piece reservoir housing. The more-compact storage allows a user of the air pump to bring that air pump to remote locations of use rather than buying, renting or not having an pump at the remote location, which reduces a user's overall costs and increases the user's overall enjoyment of recreational activities that require air pumps (e.g., kite surfing, rafting, biking, or other activities). Greater use of the improved pumps also reduces waste by eliminating the need to have different air pumps at different locations. Smaller storage footprints more-efficiently occupy storage space anywhere—e.g., in a car, in a garage, on the person during a recreational activity, or in other places.

Some improved air pumps described herein include piston shafts that have multiple portions and/or include handles that can decouple from piston shafts to further reduce storage volume occupied by disassembled air pumps.

Figure 2A:
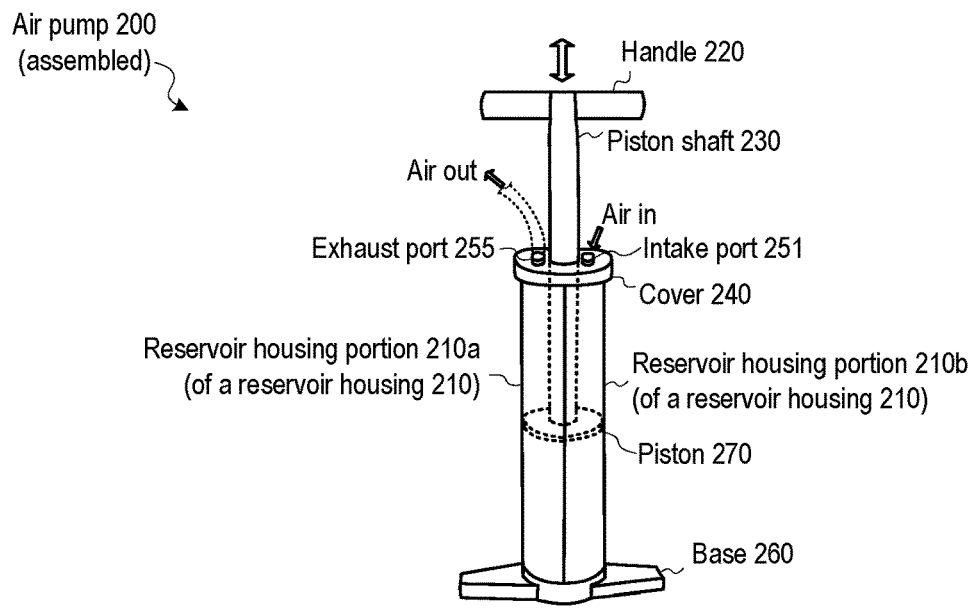
FIG. 2A-2B depict an air pump that includes a reservoir housing comprising multiple vertically cut reservoir housing portions.
Figure 2B:
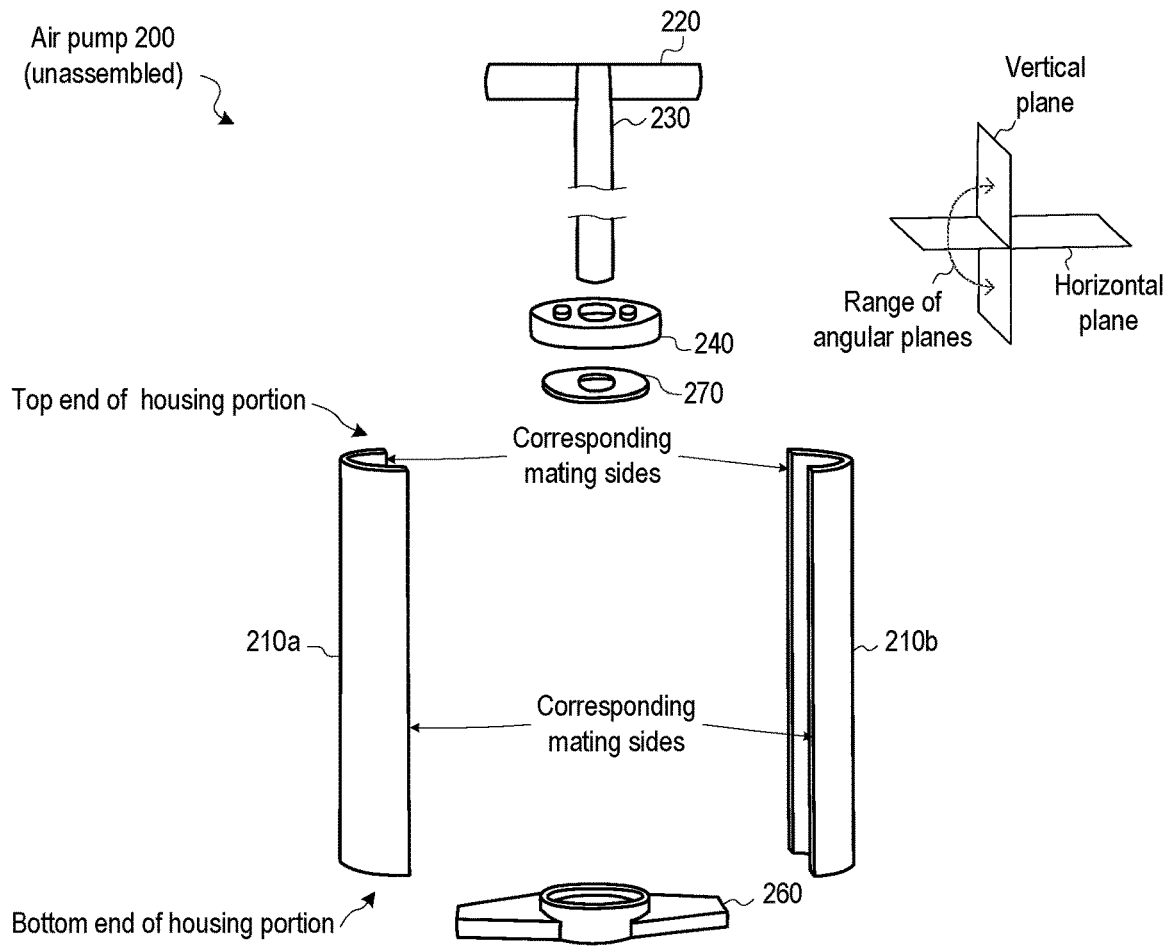
Figure 2C:
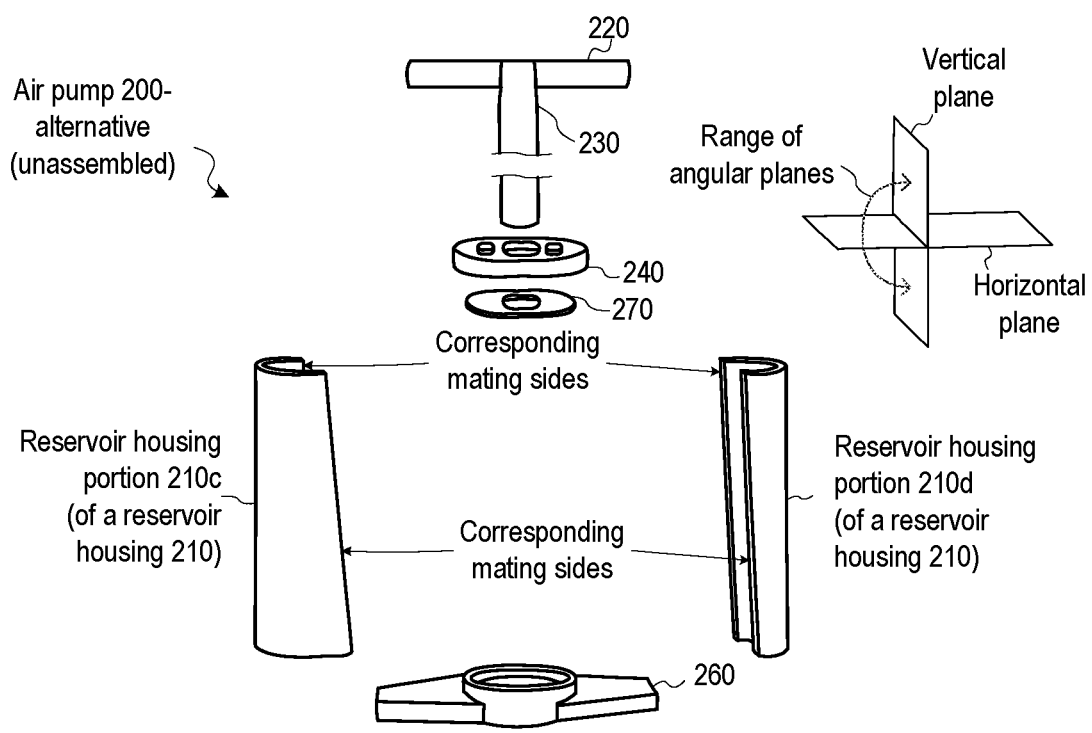
FIG. 2C depicts an air pump that includes a reservoir housing comprising multiple angularly cut reservoir housing portions.

FIG. 2A and FIG. 2B depict an air pump 200 that includes a reservoir housing 210 comprising multiple portions 210a through 210b. Only two portions that are dimensionally similar are illustrated, but other embodiments may include more than two portions where each portion is dimensionally similar. Dimensionally similar portions are not a requirement, and the different portions of the reservoir housing can have different dimensions as desired. The reservoir housing portions 210a and 210b are depicted as vertically cut portions (e.g., halves) of the reservoir 210—e.g., portions created by separating a reservoir housing (or part of the reservoir housing) along a vertical plane that extends from a top end of the reservoir housing (or part of the reservoir housing) to a bottom end of the reservoir housing (or part of the reservoir housing). Each of the portions have sides that mate with another portion to form the reservoir housing 210. Examples of means for mating different vertically cut portions of a reservoir housing are described later. A reservoir volume is formed when (i) the corresponding mating sides of the reservoir housing portions 210a and 210b are connected to each other to form the reservoir housing 210, and (ii) the reservoir housing 210 is connected to the cover 240 and the base 260 to form a reservoir volume in which the piston 270 moves to pull air into the reservoir housing 210 through the intake port 251 and to push air out of the reservoir housing 210 through the exhaust port 255. In some embodiments (not shown), the piston shaft 230 can be comprised of multiple portions (e.g., vertically cut or horizontally cut portions), and the handle 220 can disassemble from the piston shaft 230. FIG. 2C depicts an alternative air pump 200 that includes a reservoir housing 210 comprising multiple portions 210c through 210d. The reservoir housing portions 210c and 210d are depicted as angularly cut portions of the reservoir 210—e.g., portions created by separating a reservoir housing (or part of the reservoir housing) along one of various possible angular planes.

Figure 3A:
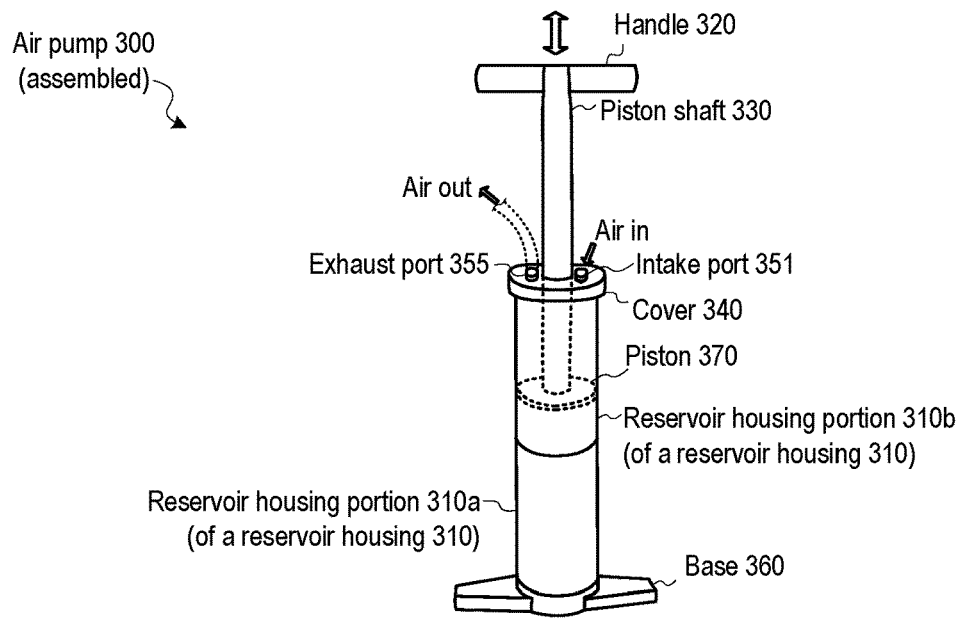
FIG. 3A-3B depict an air pump that includes a reservoir housing comprising multiple horizontally cut reservoir housing portions.
Figure 3B:
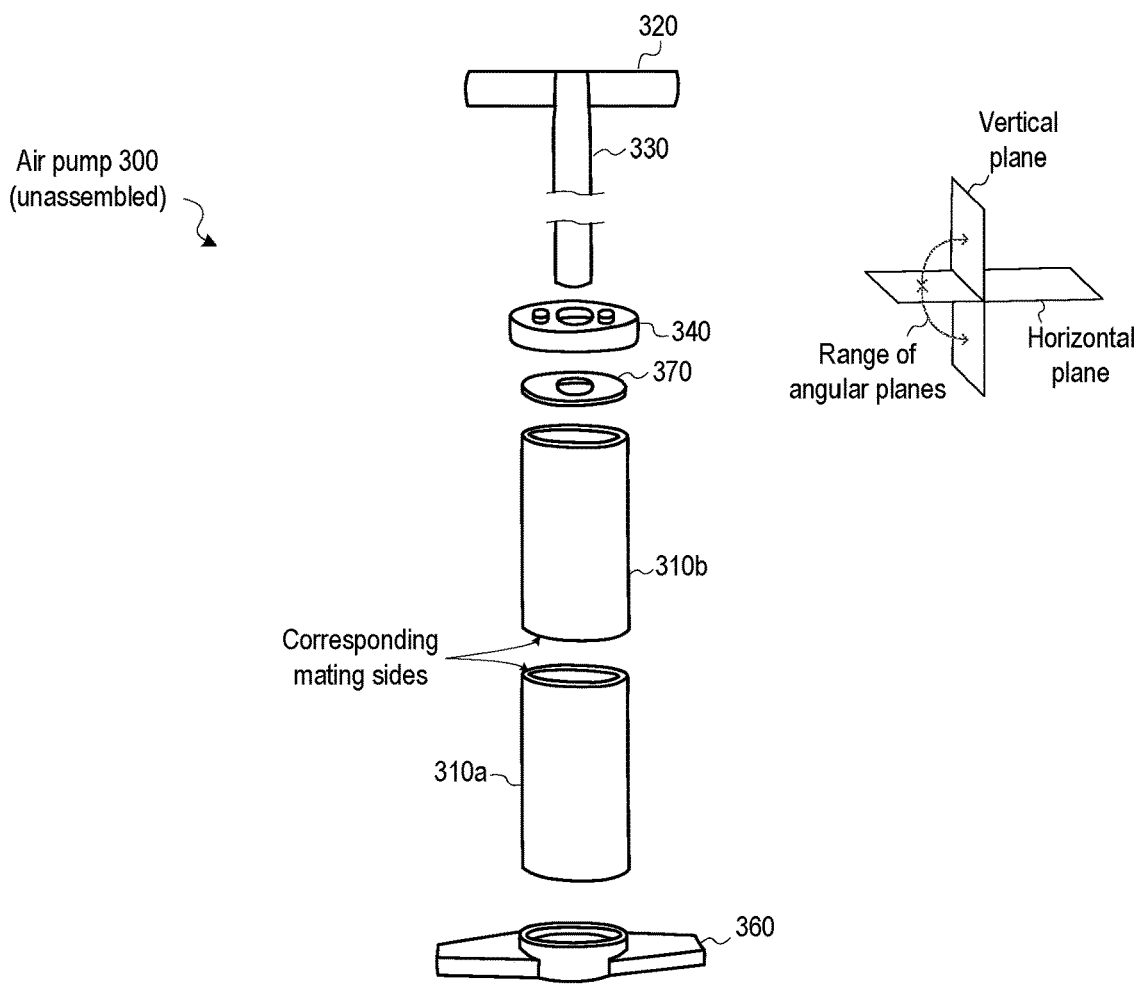
Figure 3C:
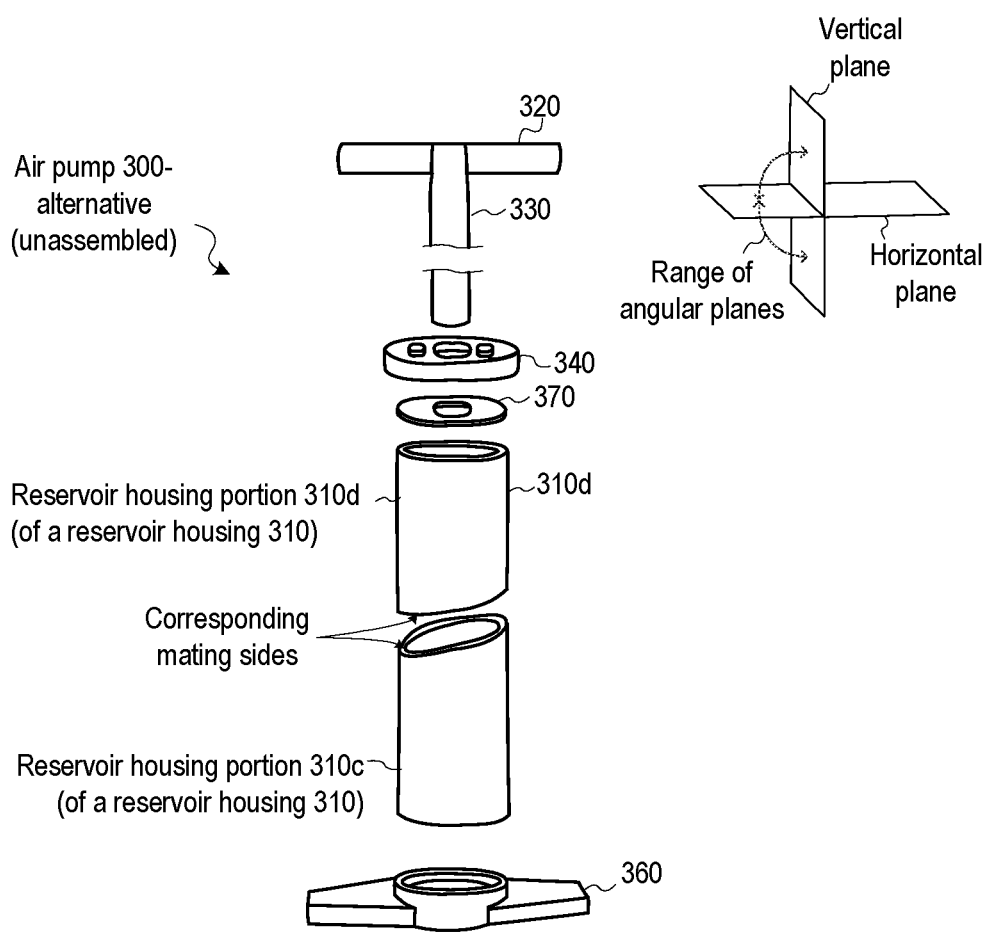
FIG. 3C depicts an air pump that includes a reservoir housing comprising multiple angularly cut reservoir housing portions.

FIG. 3A and FIG. 3B depict an air pump 300 that includes a reservoir housing 310 comprising multiple portions 310a through 310b. Only two portions that are dimensionally similar are illustrated, but other embodiments may include more than two portions where each portion is dimensionally similar. Dimensionally similar portions are not a requirement, and the different portions of the reservoir housing can have different dimensions as desired. If needed, the length of the piston shaft 330 can be extended so the piston 370 travels along a longitudinal length between top and bottom ends of a reservoir created by assembling the reservoir housing portions, the cover and the base. The reservoir housing portions 310a and 310b are depicted as horizontally cut portions (e.g., halves) of the reservoir 310—e.g, portions created by separating a reservoir housing (or part of the reservoir housing) along a horizontal plane that is perpendicular to the vertical place described previously with respect to FIG. 2A and FIG. 2B. Each of the portions have sides that mate with another portion to form the reservoir housing 310. Examples of means for mating different horizontally cut portions of a reservoir housing are described later. A reservoir is formed when (i) the corresponding mating sides of the reservoir housing portions 310a and 310b are connected to each other to form the reservoir housing 310, and (ii) the reservoir housing 310 is connected to the cover 340 and the base 360 to form a reservoir volume in which the piston 370 moves to pull air into the reservoir housing 310 through the intake port 351 and to push air out of the reservoir housing 310 through the exhaust port 355. In some embodiments (not shown), the piston shaft 330 can be comprised of multiple portions (e.g., vertically cut or horizontally cut portions), and the handle 320 can disassemble from the piston shaft 330. FIG. 3C depicts an alternative air pump 300 that includes a reservoir housing 310 comprising multiple portions 310c through 310d. The reservoir housing portions 310c and 310d are depicted as angularly cut portions of the reservoir 310—e.g., portions created by separating a reservoir housing (or part of the reservoir housing) along one of various possible angular planes.

Figure 4A:
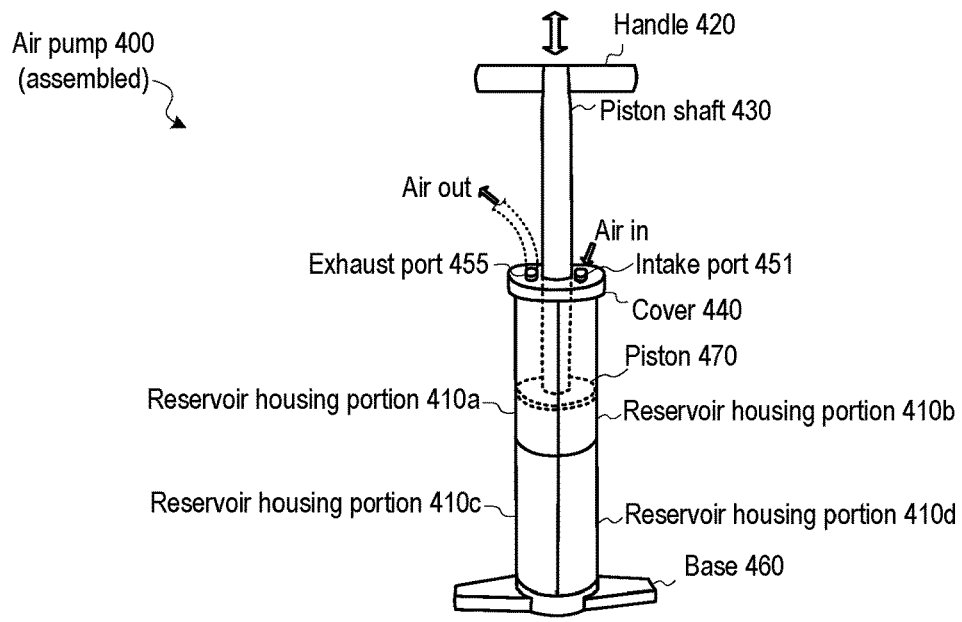
FIG. 4A-4B depict an air pump that includes a reservoir housing comprising multiple horizontally and vertically cut reservoir housing portions.
Figure 4B:
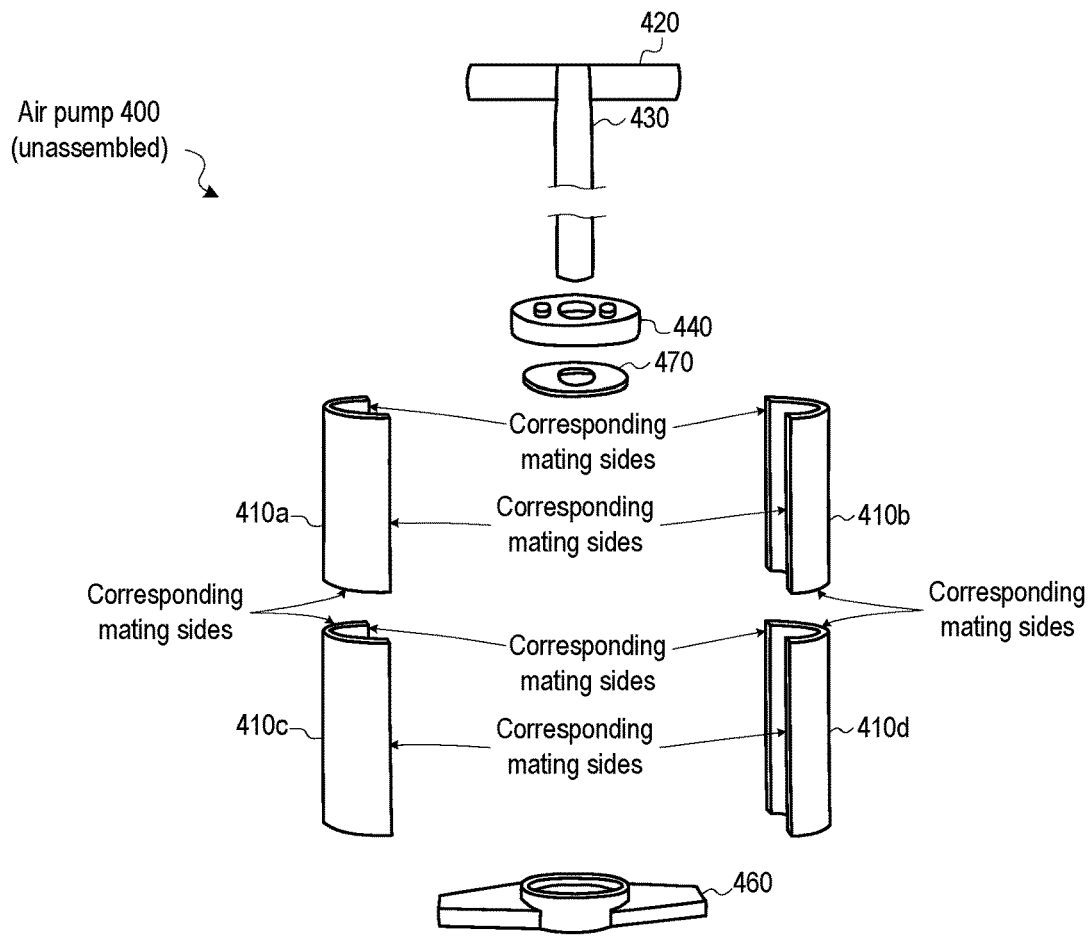

FIG. 4A and FIG. 4B depict an air pump 400 that includes a reservoir housing comprising multiple portions 410a through 410d. Four portions that are dimensionally similar are illustrated, but other embodiments may include more than four portions where each portion is dimensionally similar. Dimensionally similar portions are not a requirement, and the different portions of the reservoir housing can have different dimensions as desired. The reservoir housing portions 410a and 410b are depicted as vertically cut portions (e.g., halves) of a horizontally cut part (e.g., half) of the reservoir housing, and the reservoir housing portions 410c and 410d are depicted as vertically cut portions (e.g., halves) of another horizontally cut part (e.g., half) of the reservoir housing. Alternatively, the reservoir housing portions 410*a* and 410*c* can be described as horizontally cut portions (e.g., halves) of a vertically cut part (e.g., half) of the reservoir housing, and the reservoir housing portions 410*b* and 410*d* can be described as horizontally cut potions (e.g., halves) of another vertically cut part (e.g., half) of the reservoir housing. Each of the portions have sides that mate with other portions to form the reservoir housing. Examples of means for mating different portions of a reservoir housing are described later. A reservoir is formed when (i) the corresponding mating sides of the reservoir housing portions 410*a* through 410*d* are connected to form a reservoir housing, and (ii) the reservoir housing is connected to the cover 440 and the base 460 to form the reservoir in which the piston 470 moves to pull air into the reservoir housing through the intake port 451 and to push air out of the reservoir housing through the exhaust port 455. In some embodiments (not shown), the piston shaft 430 can be comprised of multiple portions (e.g., vertically cut or horizontally cut portions), and the handle 420 can disassemble from the piston shaft 430.

Other portions are contemplated other than vertically cut and horizontally cut portions, including portions created by separating a reservoir housing (or part of the reservoir housing) along a plane at any angle between the vertical plane and the horizontal plane. Such portions are referred to herein as angularly-cut portions. For reference, FIG. 2B and FIG. 3B illustrate a vertical plane, a horizontal plane, and a range of angular planes. By way of example, two angularly-cut portions are created by cutting a reservoir housing (or part of a reservoir housing) along an angular plane within the range of angular planes. Different air pumps with reservoir housing portions cut along different planes provide different advantages in terms of the storage profiles of those air pumps (e.g., vertically cut portions can nest to occupy less space in one dimension but are longer in another dimension compared to horizontally cut portions).

Examples of mating surfaces in the figures are generally shown as spanning along a single plane from end to end, but this is not a requirement. Instead, the mating surfaces could be alternatively cut as a curve, a zig-zag, or a combination of planes—e.g., a first section of a mating surface along a first plane and a second section of the mating surface along a second plane where a transition from the first plane to the second plane occurs at an intersection of the first and second sections of the mating surface. Use of mating surfaces that do not span along a single plane can advantageously show a user where to mate the two surfaces compared to single plane mating surfaces that may create uncertainty.

Figure 5A:
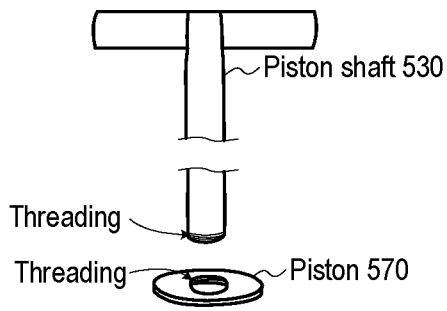
FIG. 5A-5B show examples of coupling means for joining a piston shaft and a piston of an air pump.
Figure 5B:
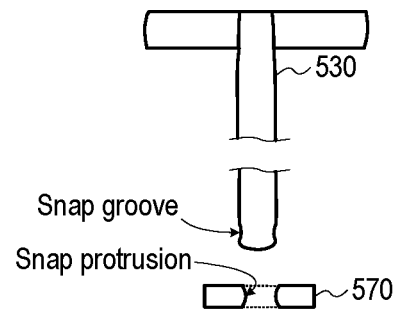
Figure 5C:
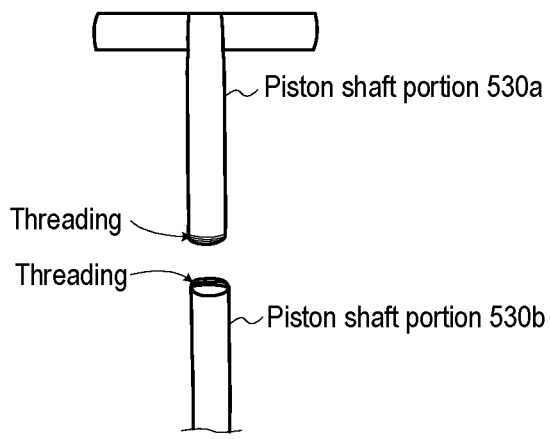
FIG. 5C-5D show examples of coupling means for joining portions of a piston shaft of an air pump.
Figure 5D:
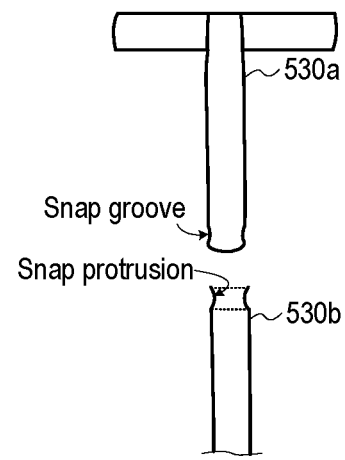

Examples of coupling means for joining a piston shaft 530 and a piston 570, and for joining piston shaft portions 530*a* and 530*b* of a piston shaft 530, are respectively provided in FIG. 5A-B and FIG. 5C-D. The examples include compatible male and female threading connections (FIG. 5A and FIG. 5C), and compatible groove and protrusion snap-fit connections (FIG. 5B and FIG. 5D). Coupling by threading occurs by rotating one or both of the components in one direction and decoupling occurs by rotating one or both of the components in an opposite direction. Coupling by snap protrusion and groove occurs by pushing the components together and decoupling occurs by pulling the components apart. Although not shown, other coupling means are contemplated, including twisting and locking of a tab into a slot, or other means known in the art.

Figure 6A:
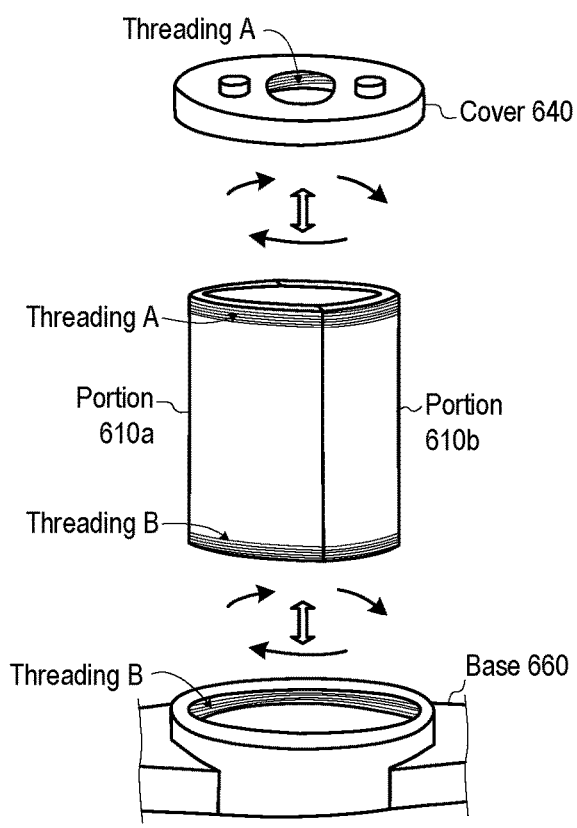
FIG. 6A-6B show examples of coupling means for joining a reservoir housing with a cover and a base of an air pump.
Figure 6B:
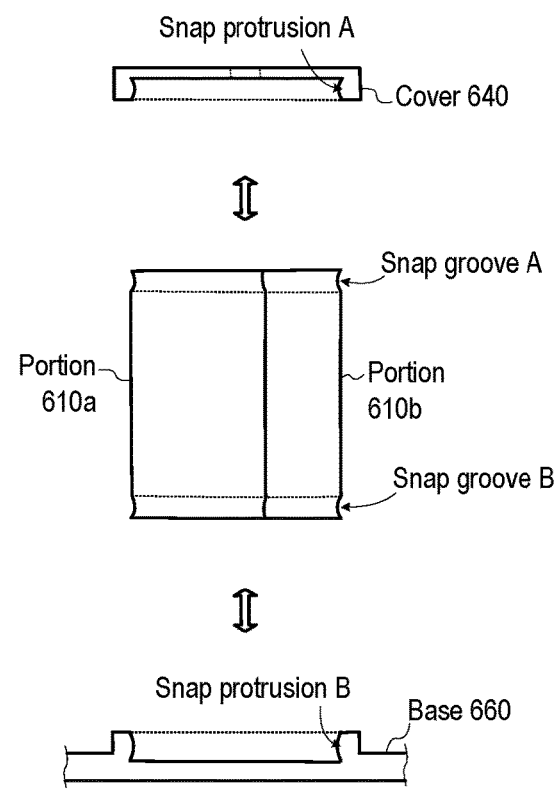

Examples of coupling means for joining a reservoir housing comprising vertically cut portions 610*a* and 610*b* with a cover 640 and a base 660 are provided in FIG. 6A and FIG. 6B. The examples include compatible male and female threading connections A and B (FIG. 6A), and compatible groove and protrusion snap-fit connections A and B (FIG. 6B). Coupling by threading occurs by rotating one or both of the components in one direction and decoupling occurs by rotating one or both of the components in an opposite direction. Coupling by snap protrusion and groove occurs by pushing the components together and decoupling occurs by pulling the components apart. Although not shown, other coupling means are contemplated, including twisting and locking of a tab into a slot, or other means known in the art.

Figure 7A:
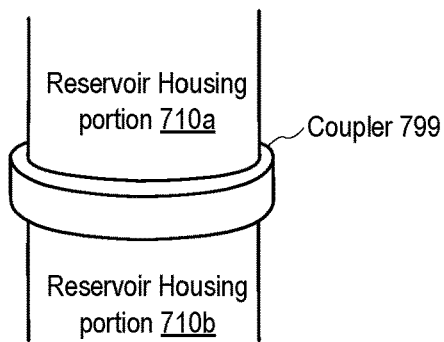
FIG. 7A-7H show examples of coupling means for joining horizontally cut reservoir housing portions of an air pump.
Figure 7B:
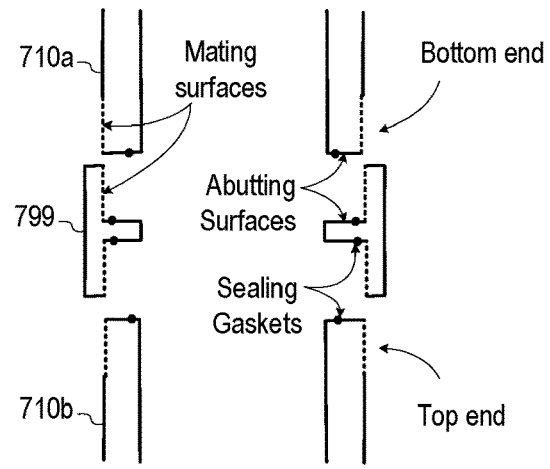
Figure 7C:
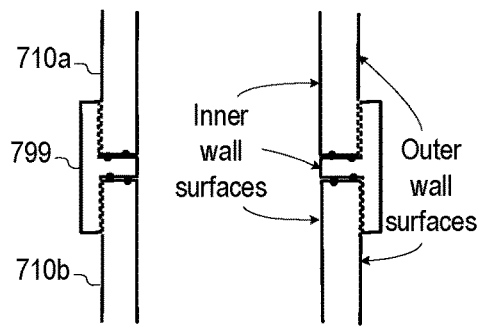
Figure 7D:
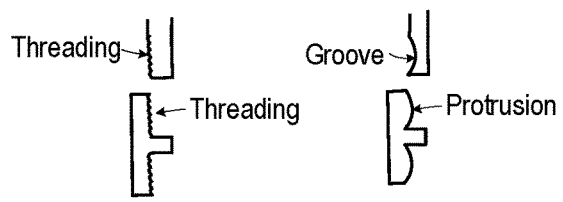
Figure 7E:
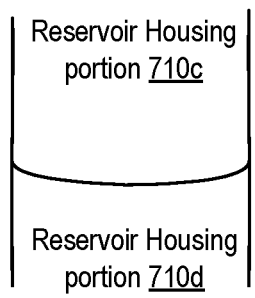
Figure 7F:
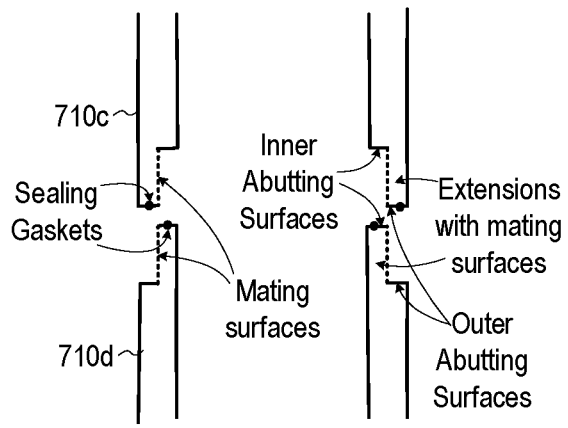
Figure 7G:
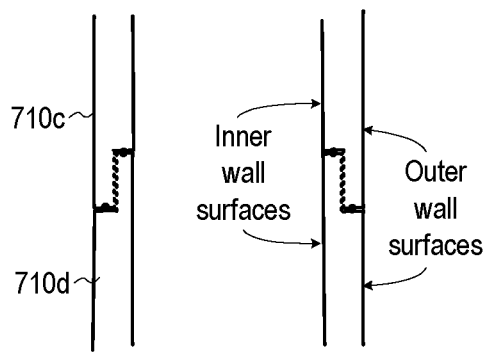
Figure 7H:
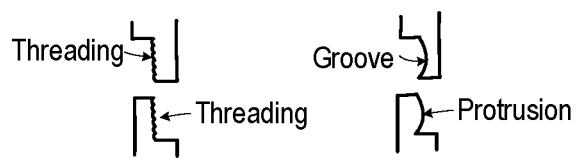
Figure 11A:
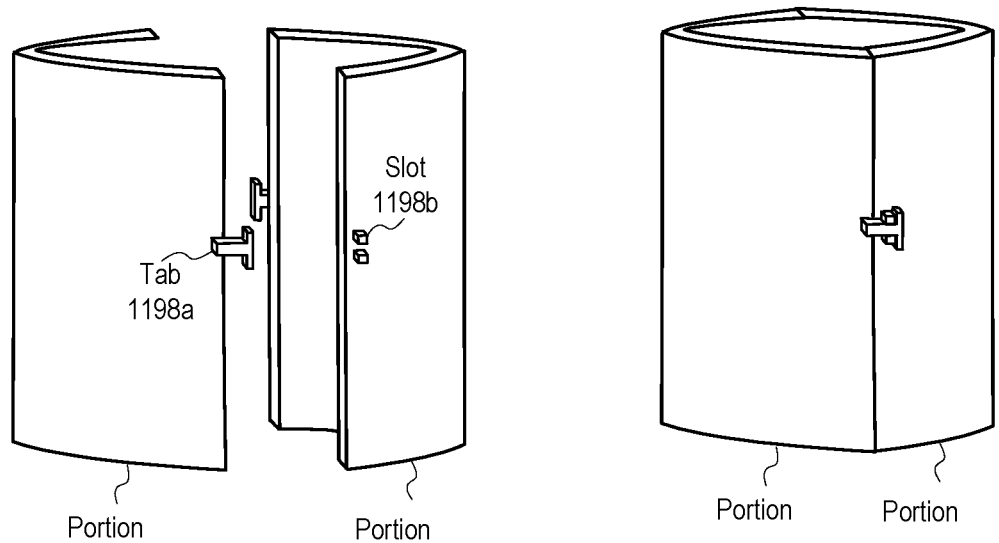
FIG. 11A-12B show different coupling means for joining vertically cut reservoir housing portions and for joining horizontally cut reservoir housing portions of air pumps.
Figure 11B:
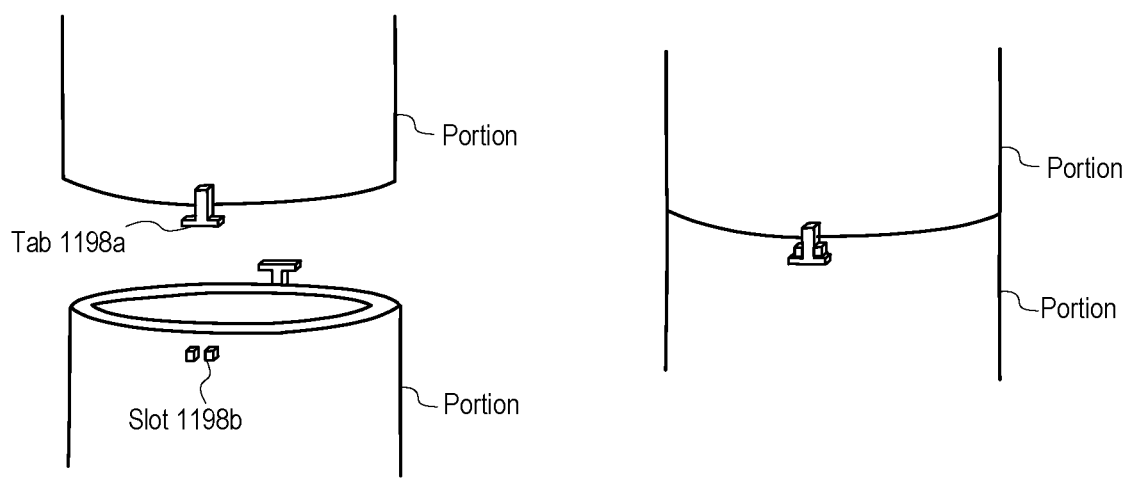
Figure 12A:
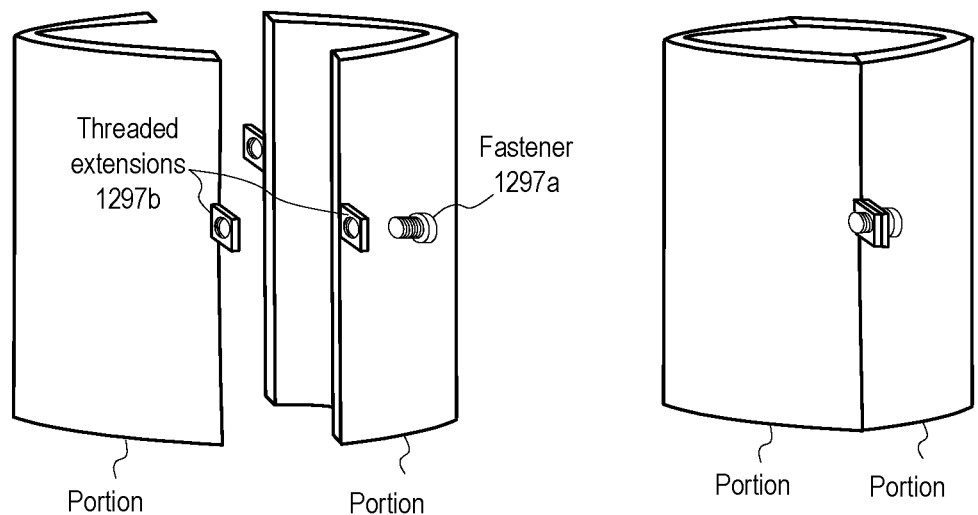
Figure 12B:
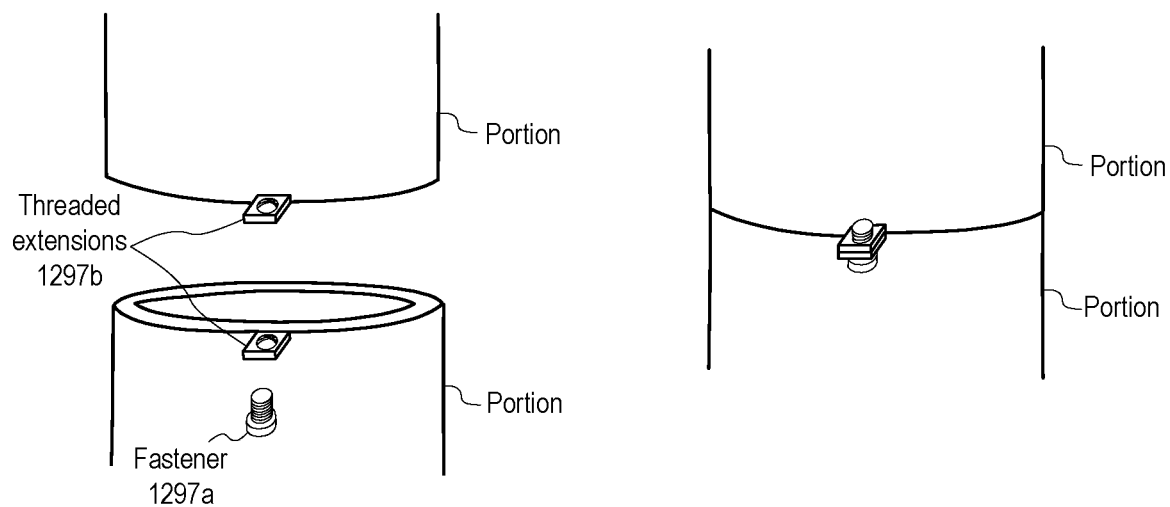

Examples of coupling means for joining two horizontally cut reservoir housing portions 710*a* and 710*b* of a reservoir housing are provided in FIG. 7A through FIG. 7H. Perspective views of two different embodiments are shown in FIG. 7A and FIG. 7E, and cross-section side views of those the different embodiments are respectively shown in FIG. 7B through FIG. 7D and FIG. 7F through FIG. 7H.

An embodiment shown in FIG. 7A through FIG. 7D includes a coupler 799 that is disposed between the reservoir housing portions 710*a* and 710*b*. Mating surfaces on outer surfaces at ends of the potions 710*a* and 710*b* are configured to couple to corresponding mating surfaces on inner surfaces at opposite ends of the coupler 799, as shown in FIG. 7B and FIG. 7C. Sealing gaskets may be embedded into or on top of either or both abutting surfaces of the portions 710*a* and 710*b* and the coupler 799 to create a seal when the portions 710*a* and 710*b* are connected to the coupler 799. A downward-facing abutting surface at the bottom of portion 710*a* is configured to abut against an upward-facing abutting surface of the coupler 799 after the portion 710*a* is inserted into the coupler 799. An upward-facing abutting surface at the top of portion 710*b* is configured to abut against a downward-facing abutting surface of the coupler 799 after the portion 710*b* is inserted into the coupler 799. At least one sealing gasket is shown as being positioned between corresponding abutting surfaces. When the portion 710*a*, the portion 710*b*, and the coupler 799 are assembled, inner wall surfaces of those components are aligned to create a smooth inner wall surface of a reservoir housing formed by the portions 710*a*, 710*b* and coupler 799. Outer wall surfaces of the portions 710*a* and 710*b* are also aligned. The mating surfaces may include compatible male and female threading connections, compatible groove and protrusion snap-fit connections (FIG. 7D), or other means (e.g., twisting and locking of a tab into a slot, or other means known in the art).

An embodiment shown in FIG. 7E through FIG. 7H includes reservoir housing portions 710*c* and 710*d*. The portion 710*c* includes an extension at the bottom of the housing portion that extends along an outer wall surface of the portion 710*c*, and that includes an inward-facing mating surface that is not aligned with an inner wall surface of the portion 710*c*. The portion 710*d* includes an extension at the top of the housing portion that extends along an inner wall surface of the portion 710*d*, and that includes an outward-facing mating surface that is not aligned with an outer wall surface of the portion 710*d*. The width of the extensions are less than the widths of the walls of the portions 710*c* and 710*d*. The inward-facing mating surface of the portion 710*c* and the outward-facing mating surface of the portion 710*d* are configured to couple to each other when the portions 710*c* and 710*d* are assembled to form a reservoir housing (or part of a reservoir housing). Sealing gaskets may be embedded into or attached onto either or both inner abutting surfaces of the portions 710*c* and 710*d* and sealing gaskets may be embedded into or attached onto either or both outer abutting surfaces of the portions 710*c* and 710*d*. The inner abutting surface and the outer abutting surface of the portion 710c are positioned at opposite ends of the mating surface of the portion 710c, and they extend away from the respective ends of the mating surface along opposite directions to the inner wall and the outer wall of the portion 710c, respectively. Similarly, the inner abutting surface and the outer abutting surface of the portion 710d are positioned at opposite ends of the mating surface of the portion 710d, and they extend away from the respective ends of the mating surface along opposite directions to the inner wall and the outer wall of the portion 710d, respectively. Downward-facing inner and outer abutting surfaces of the portion 710c are configured to abut against upward-facing inner and outer abutting surfaces of the portion 710d. At least one sealing gasket is shown as being positioned between corresponding abutting surfaces of the portions 710c and 710d. When the portions 710c and 710d are assembled, inner wall surfaces of those components are aligned to create a smooth inner wall surface of a reservoir housing formed by the portions 710c and 710d, and outer wall surfaces of the portions 710c and 710d are aligned to create a smooth outer wall surface of the reservoir housing. The mating surfaces may include compatible male and female threading connections, compatible groove and protrusion snap-fit connections (FIG. 7H), or other means (e.g., twisting and locking of a tab into a slot, or other means known in the art).

Different coupling means for mating vertically cut reservoir housing portions are shown in FIG. 8A-C, FIG. 9A-C, and FIG. 10A-C.

By way of example, FIG. 8A-C includes protrusions and complimentary grooves—e.g., the protrusions A and B can slide into or snap into respective grooves A and B to create a seal when housing portions 810a and 810b are assembled. Gasket seals can also be placed along the grooves, protrusions and/or another surface of the housing portion 810a or 810b that respectively mates with or abuts against the housing portion 810b or 810a to create a seal between the two portions 810a and 810b. FIG. 9A-C and FIG. 10A-10C demonstrate how different wall thicknesses and/or dimensions of each vertically cut housing portion can be used to provide more-compact storage compared to the embodiment of FIG. 8A-C where vertically cut portions are nested. As shown in FIG. 9A-C, forming the housing portions 910a and 910b such that the dimension of the outer surface of the housing portion 910a is smaller than the dimension of the outer surface of the housing portion 910b, the dimension of the outer surface of the housing portion 910a is larger than the dimension of the inner surface of the housing portion 910b, and the dimensions of the inner surfaces of the housing portions 910a and 910b are generally the same, provides for a smaller storage dimension compared to the embodiment of FIG. 8A-C, and allows for a symmetrical piston 970 to fit in the lateral cross-sectional area of the reservoir volume that is formed when the housing portions 910a and 910b are assembled. One example of a dimension of a surface is a radius from the center of the reservoir volume to the surface. Different dimensions of outer surfaces for the portions 910a and 910b require the cover and base to have an internal shape that matches the external shape of the assembled portions 910a and 910b. As shown in FIG. 10A-C, forming the housing portions 1010a and 1010b such that the dimension of the outer surface of the housing portion 1010a is the same or smaller than the dimension of the inner surface of the housing portion 1010b provides for a smaller storage dimension compared to the embodiment of FIG. 9A-C, but requires a non-symmetrical piston 1070 to fit in the lateral, cross-sectional area of the reservoir that is formed when the housing portions 1010a and 1010b are assembled. Different dimensions of outer surfaces for the portions 1010a and 1010b require the cover and base to have an internal shape that matches the external shape of the assembled portions 1010a and 1010b.

Additional coupling means for joining vertically cut and horizontally cut reservoir housing portions are shown in FIG. 11A through FIG. 11B and FIG. 12A through FIG. 12B. The coupling means include tab 1198a and slot 1198b combinations, and fastener 1297a through adjacent threaded extensions 1297b combinations.

Sealing means for creating a sealed reservoir volume using sealing gaskets on or embedded into abutting surfaces of the reservoir housing portions are illustrated in FIG. 13A (disassembled configuration) and FIG. 13B (assembled configuration). As shown, the gaskets can be attached to or embedded into surfaces of one housing portion that abut surfaces of another housing portion when the air pump is assembled, such that the gaskets fill any space between the sides of reservoir housing portions to create a sealed reservoir volume.

Sealing means for creating a sealed reservoir volume using sealing gaskets on or embedded into abutting surfaces of the reservoir housing, the cover and the base are illustrated in FIG. 14A (perspective view) and FIG. 14B (cross-sectional side view). As shown, the gaskets can be attached to or embedded into surfaces of the reservoir housing that abut surfaces of the cover and the base when the air pump is assembled, such that the gaskets fill any space between the sides of reservoir housing, the cover and the base to create a sealed reservoir volume.

FIG. 15A through FIG. 15F depict an air pump 1500 that includes a reservoir housing comprising multiple portions 1510a and 1510b. Two telescoping portions are illustrated, but other embodiments may include more than two telescoping portions. The portions 1510a and 1510b are different sizes such that one portion (e.g., portion 1510b) has a wider dimension than the other portion that has a narrower dimension (e.g., 1510a), which allows the narrower portion 1510a to slide up and down from within the wider portion 1510b. Upward movement of the narrower portion 1510a is restricted when an outward extension at the bottom of the narrower portion 1510a meets an inward extension at the top of the wider portion 1510b, as shown in FIG. 5C. The inward extension extends inward from a wall of the wider portion 1510b, and the outward extension extends outward from a wall of the narrower portion 1510a. A lateral, cross-sectional area between an internal wall surface of the wider portion 1510b (e.g., an internal wall of the inward extension) is larger than a lateral, cross-sectional area between an outer wall surface of the narrower portion 1510a to allow for insertion of the narrower portion 1510a into the inside of the wider portion 1510b, and to further allow for movement of the narrower portion 1510a up and down from inside the wider portion 1510b.

Figure 15A:
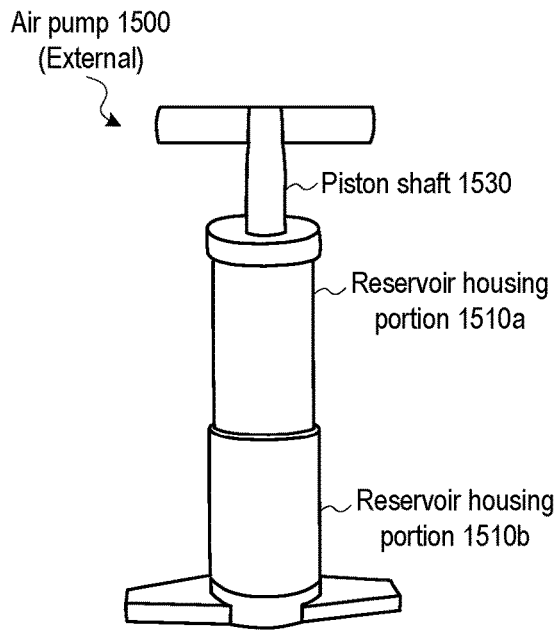
FIG. 15A-15F depict an air pump that includes a reservoir housing comprising multiple telescoping reservoir housing portions.
Figure 15B:
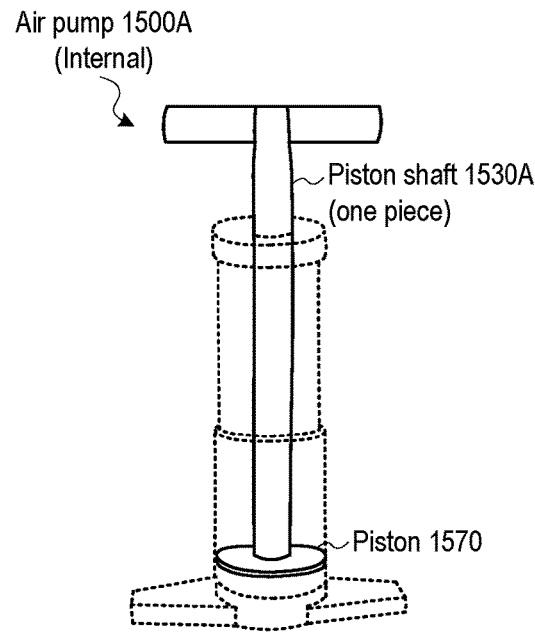
Figure 15C:
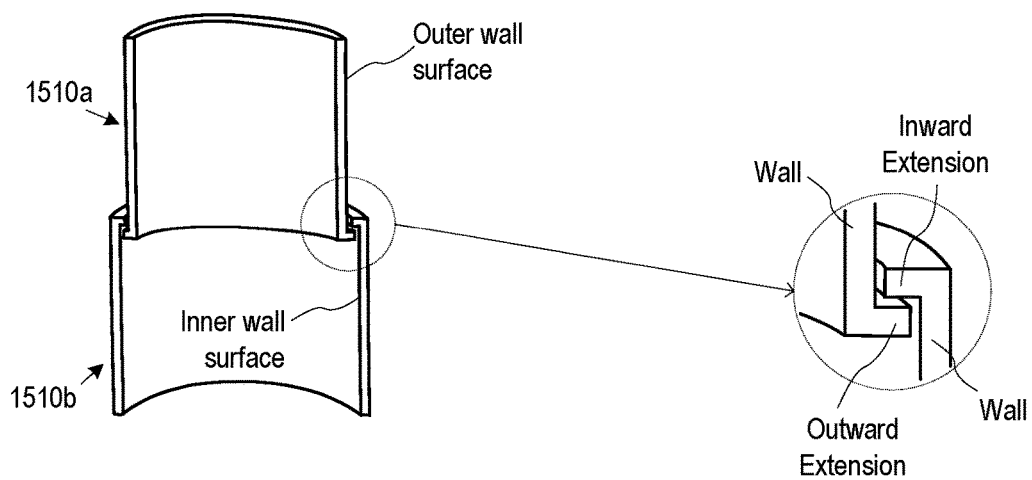
Figure 15D:
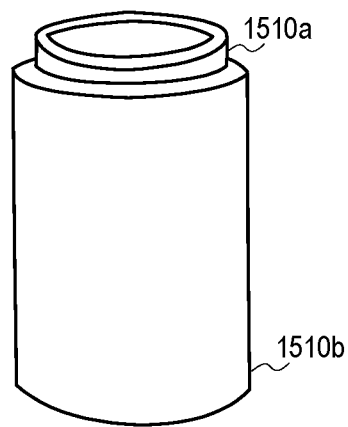
Figure 15E:
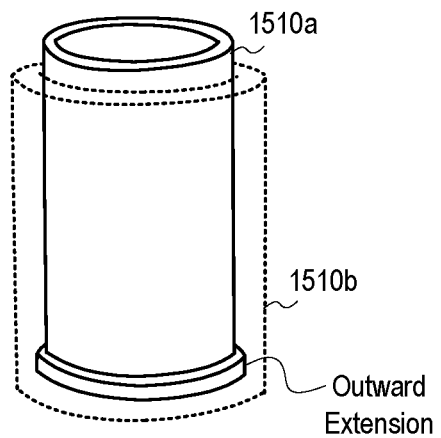
Figure 15F:
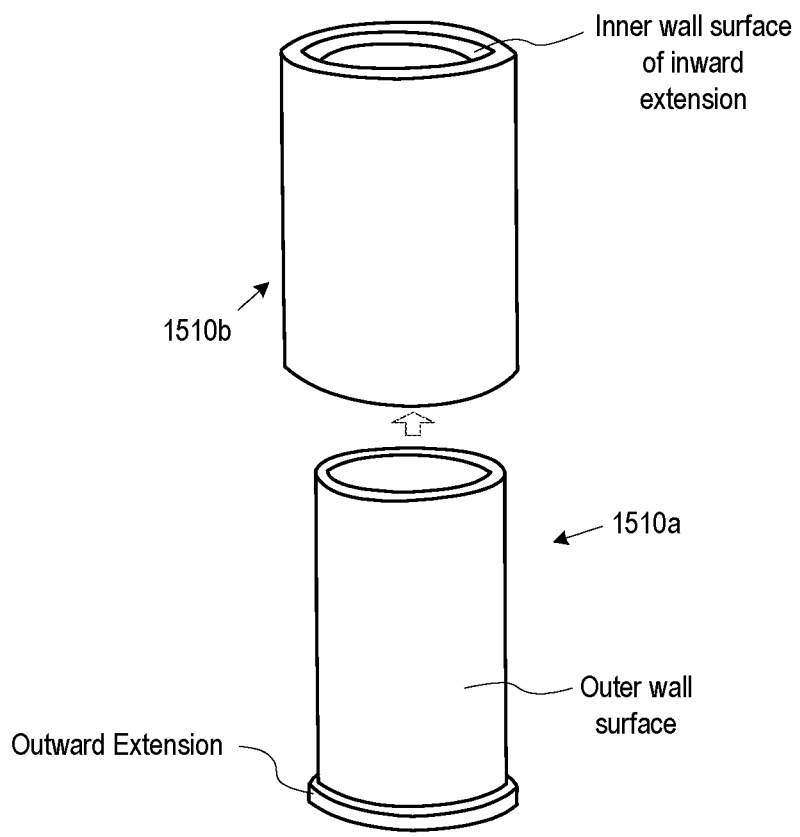
Figure 15G:
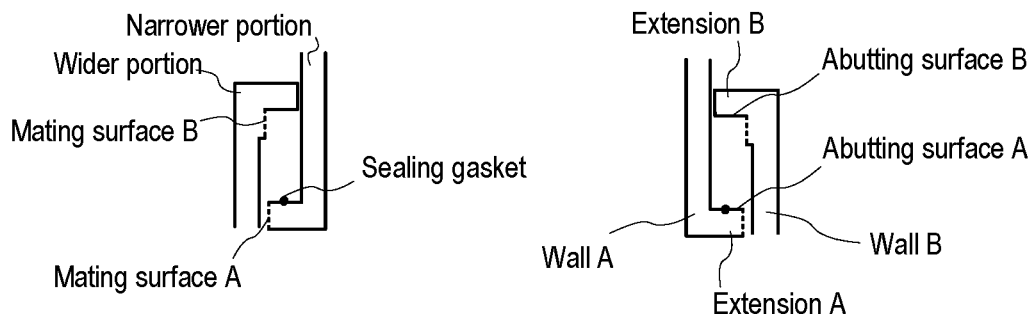
FIG. 15G-15J depict different connection means for coupling telescoping reservoir housing portions when an air pump is in an assembled configuration.
Figure 15H:
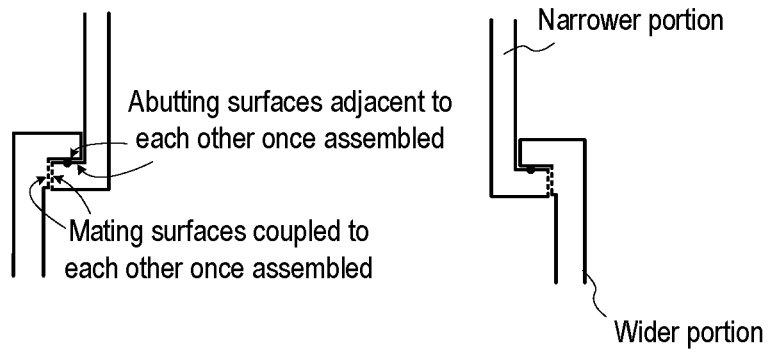
Figure 15I:
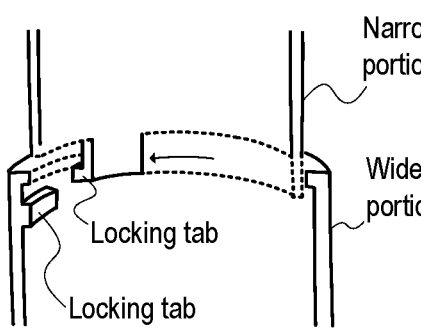
Figure 15J:
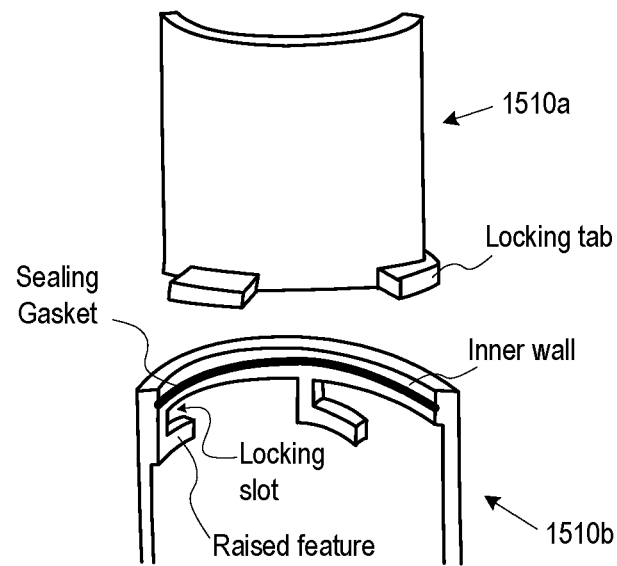

Different connection means for coupling the narrower portion 1510a and the wider portion 1510b in the assembled configuration are shown in FIG. 15G through FIG. 15J. As shown in FIG. 15G and FIG. 15H, corresponding mating surfaces of the narrower portion and the wider portion connect to each other to assemble the reservoir housing after the outward extension (A) of the narrower portion moves upward towards the inward extension (B) until an abutting surface (A) on top of the outward extension (A) abuts an abutting surface (B) on bottom of the inward extension (B). A sealing gasket can be embedded into or positioned onto one or both of the abutting surfaces to create a seal between the narrower and the wider portions when assembled. The mating surfaces comprise any suitable coupling means, including: (i) compatible male threading and female threading where coupling occurs by rotating one or both of the portions in one direction, and decoupling occurs by rotating one or both of the portions in an opposite direction; (ii) compatible snap protrusion and groove where coupling occurs by pulling upward on the narrower portion and/or downward on the wider portion, and decoupling occurs by pushing downward on the narrower portion and/or upward on the wider portion; or (iii) or other coupling means. Another connection means is shown in FIG. 15I and FIG. 15J, which show corresponding locking tabs and slots on each portion where each locking tab of the narrower portion is rotated into a corresponding slot formed by the inward extension of the wider portion and a raised feature protruding from the inner wall surface of the wider portion. A sealing gasket is shown on an inner wall of the wider portion's inward extension.

Figure 15K:
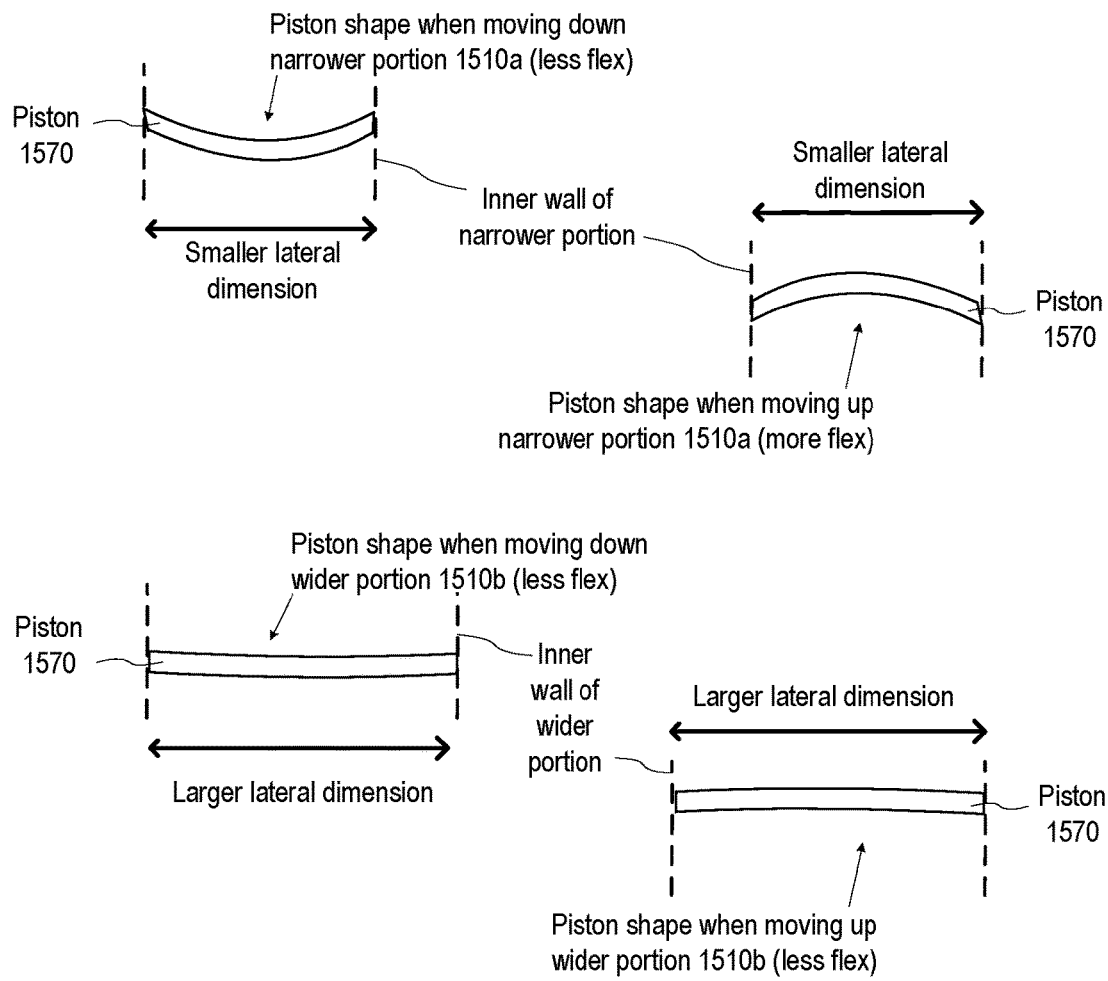
FIG. 15K-15L depict different shapes of deformable pistons for use within an assembled telescoping reservoir housing of an air pump.
Figure 15L:
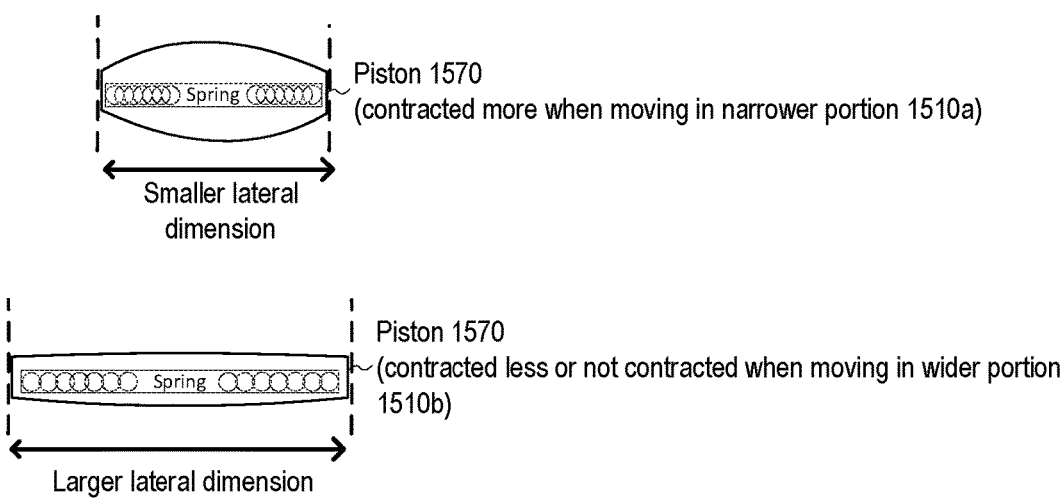

FIG. 15K and FIG. 15L depict different deformable pistons for use within the assembled telescoping reservoir housing portions 1510a and 1510b. Each piston is configured to cover different lateral, cross-sectional dimensions of the reservoir volume created by the reservoir housing portions 1510a and 1510b after assembly of the air pump. In FIG. 15K, the piston deforms vertically to form a curved shape when traveling up and down within the portions. The height of the curved shape is more when the piston is traveling in the narrower portion and is less when the piston is traveling in the wider portion. A uniform, rubber piston is suitable to deform vertically as shown in FIG. 15K. Of course, other materials can be used. In FIG. 15L, the piston deforms horizontally to form compressed masses of different widths and heights when traveling up and down within the portions. The widths and heights of the compressed mass are respectively narrower and taller when the piston is traveling in the narrower portion, and respectively wider and shorter when the piston is traveling in the wider portion. A piston with a rubber exterior and internal, horizontal spring is suitable to contract (e.g., squeeze or otherwise reduce in a dimension, such as a width between walls) as shown in FIG. 15L. Of course, other materials can be used. Each piston has an outer dimension that is greater than the lateral, cross-sectional dimension of the reservoir section within the reservoir housing portion 1510a, and that is equal to or greater than the lateral, cross-sectional dimension of the reservoir section within the reservoir housing portion 1510b (e.g., a round disc with a resting circumference and radius equal to or greater than the circumference and radius of the inner wall of the wider portion 1510b.

Figure 16A:
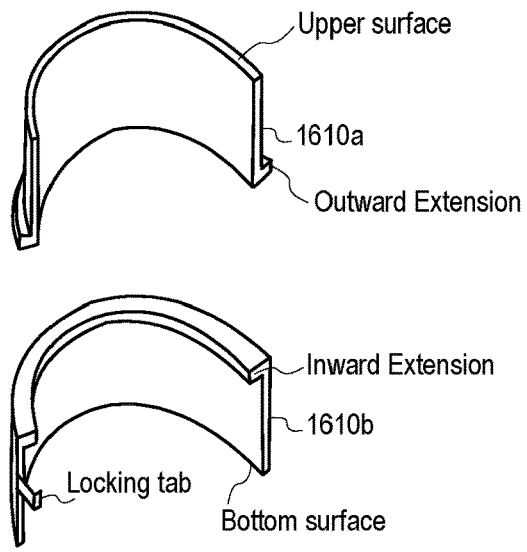
FIG. 16A-16C and FIG. 17A-17C depict different designs for multiple reservoir housing portions that nest with each other when an air pump is disassembled and that rotate into an assembled configuration when the air pump is assembled.
Figure 16B:
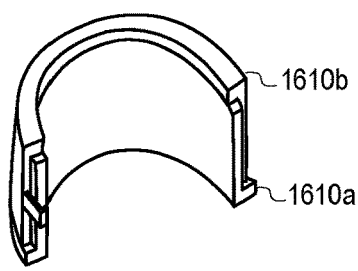
Figure 16C:
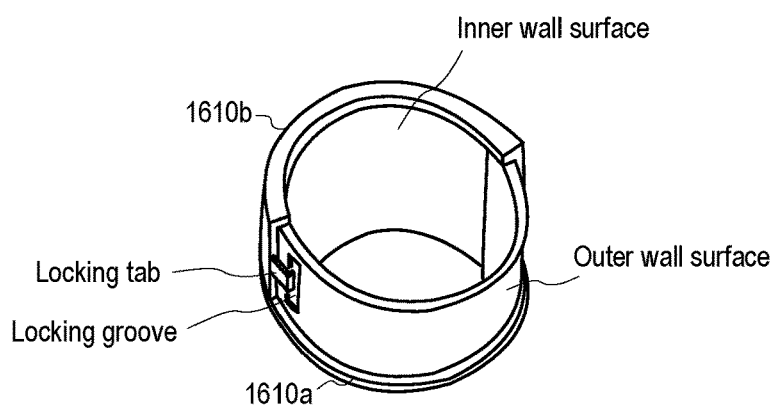

FIG. 16A through FIG. 16C depict an additional design for two reservoir housing portions 1610a and 1610b that nest with each other when the air pump is disassembled and rotate into an assembled configuration when the air pump is assembled. A bottom surface of the portion 1610b and a top surface of an outward extension of the portion 1610a abut against each other and are adapted to slide along each other. An upper surface of the portion 1610a and a bottom surface of an inward extension of the portion 1610b abut against each other and are adapted to slide along each other. A piston with a non-symmetrical shape similar to the shape of the piston shown in FIG. 10B can be used. A dimension (e.g., radius) of an inner wall surface of the portion 1610b is slightly larger than a dimension (e.g., radius) of an outer wall surface of the portion 1610a. Lateral lengths about the outer wall surface of the portion 1610a and about the inner wall surface of the portion 1610a are different to ensure portions of the inner wall surface of the portion 1610b abut portions of the outer wall surface of the portion 1610a in the assembled configuration (e.g., one is longer than the other). The portion 1610b includes a locking tab that snaps into a locking groove of the portion 1610a when the air pump is assembled to fix the portions 1610a and 1610b relative to each other. The locking tab can be released by pulling it away from and out of the locking groove. The locking tab can also prevent unwanted rotation of the portions 1610a and 1610b when in the disassembled configuration. Although one locking tab is shown at one end of the portion 1610b and one locking groove is shown near one end of the portion 1610a, another locking tab can be positioned at the other end of the portion 1610b and another locking groove can be positioned near the other end of the portion 1610a. Different dimensions of outer surfaces for the portions 1610a and 1610b require a non-symmetrical cover and base with an internal dimension that matches the external dimension of the assembled portions 1610a and 1610b. Sealing gaskets can be positioned along the abutting surfaces. Although only two portions are illustrated, more than two portions are contemplated in other embodiments.

Figure 17A:
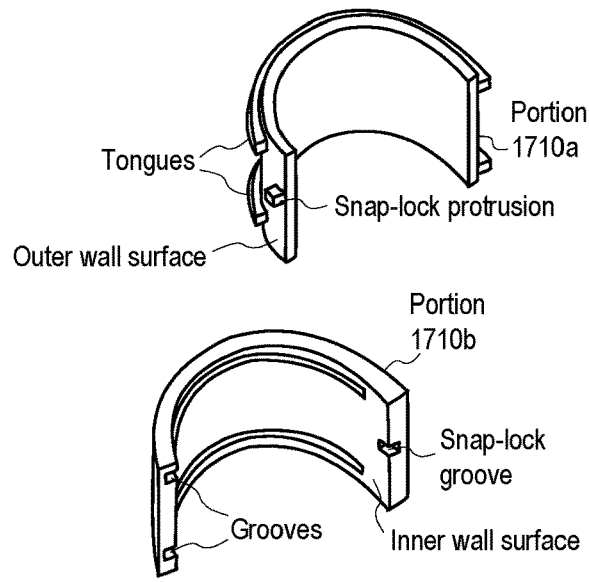
Figure 17B:
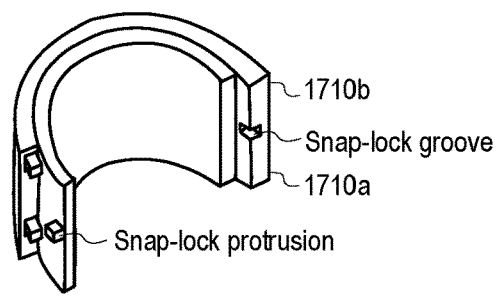
Figure 17C:
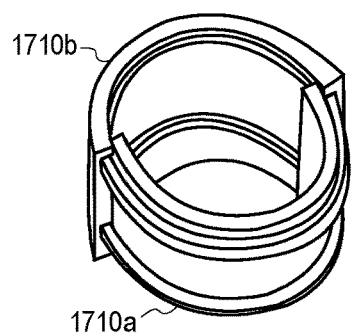

FIG. 17A through FIG. 17C depict an additional design for two reservoir housing portions 1710a and 1710b that nest with each other when the air pump is disassembled and rotate into an assembled configuration when the air pump is assembled. One or more tongues on an outer wall surface of the portion 1710a insert into corresponding grooves in an inner wall surface of the portion 1710b. A piston with a shape similar to the shape of the piston shown in FIG. 10B can be used. A dimension (e.g., radius) of the inner wall surface of the portion 1710b is slightly larger than a dimension (e.g., radius) of the outer wall surface of the portion 1710a. Lateral lengths about the outer wall surface of the portion 1710a and about the inner wall surface of the portion 1710a are different to ensure portions of the inner wall surface of the portion 1610b abut portions of the outer wall surface of the portion 1710a in the assembled configuration (e.g., one is longer than the other). The portion 1710b includes a snap-lock protrusion that snaps into a snap-lock groove of the portion 1710a when the air pump is assembled to fix the portions 1710a and 1710b relative to each other. The snap-lock protrusion can be released by pulling it away from and out of the snap-lock groove. Different dimensions of outer surfaces for the portions 1710a and 1710b require a non-symmetrical cover and base with an internal dimension that matches the external dimension of the assembled portions 1710a and 1710b. Sealing gaskets can be positioned along the abutting surfaces. Although only two portions are illustrated, more than two portions are contemplated in other embodiments.

Figure 18A:
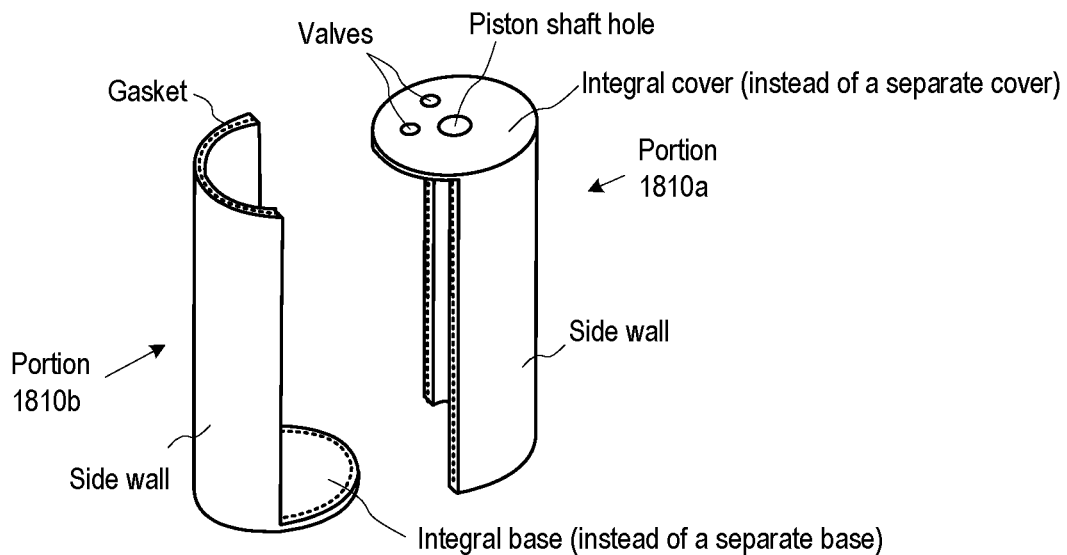
FIG. 18A-18B depict different designs for two vertically cut reservoir housing portions that include integral covers and/or bases.
Figure 18B:
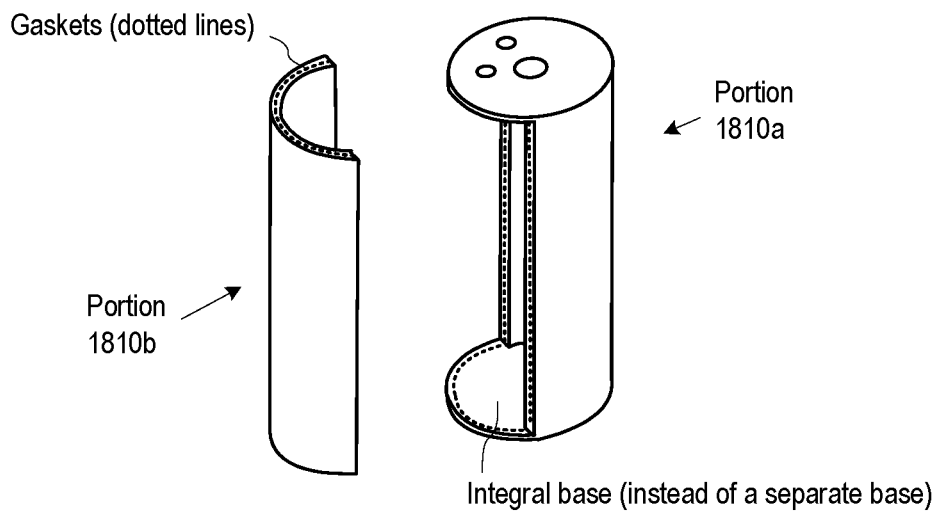

FIG. 18A and FIG. 18B depict an additional design for two reservoir housing portions 1810a and 1810b that are vertically cut. A first portion (e.g., portion 1810a) in FIGS. 18A and 18B has an integral cover with a hole to receive the piston shaft, and can accommodate airflow valves (if they are placed on the cover). When the reservoir housing portions are mated, the integral cover spans between the side walls of the portions (e.g., from inner surfaces of the side walls or from outer surfaces of the side walls). In FIG. 18A, the second portion (e.g., 1810b) has an integral base. In FIG. 18B, the first portion (e.g., 1810a) has an integral base. When the reservoir housing portions are mated, the integral base spans between the side walls of the portions. In one set of embodiments, the integral base is omitted. In one set of embodiments, the integral cover is omitted. Gaskets can be placed on any mating surfaces of the portions 1810a and 1810*b* that abut each other to create a seal. Coupling of the portions 1810*a* and 1810*b* can be by way of coupling means described herein—e.g., snap fit, tab and slot, fastener, or other means. In some embodiments, another component couples the portions together—e.g., fitting the bottom of the mated portions into a base similar to the base 260 of FIG. 2, wrapping a band around the outer walls of the mated portions, or using another suitable component.

Figure 18C:
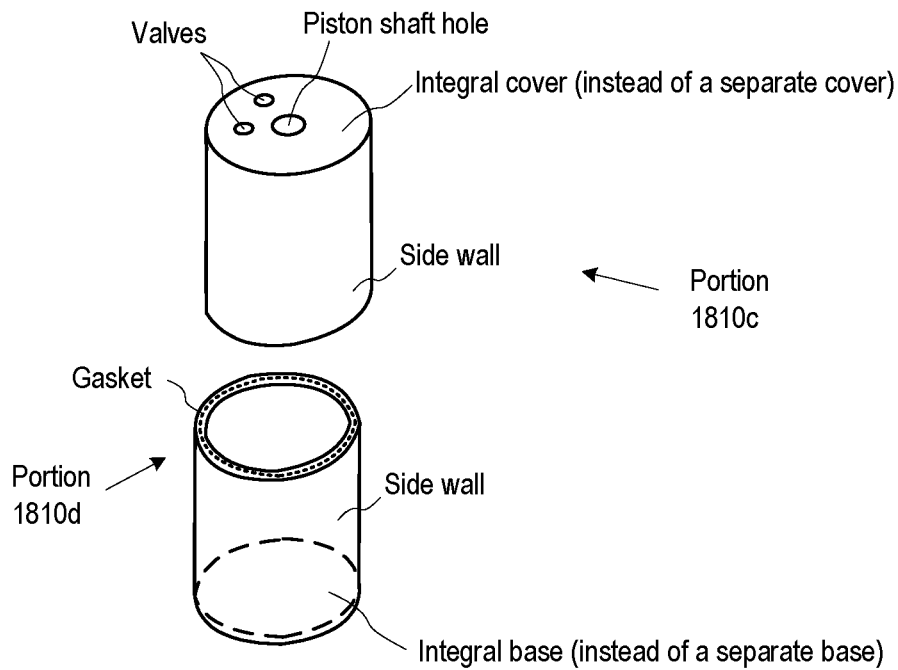
FIG. 18C-18D depict perspective and cross-section side views of a design for two horizontally cut reservoir housing portions that respectively include an integral cover and integral base.
Figure 18D:
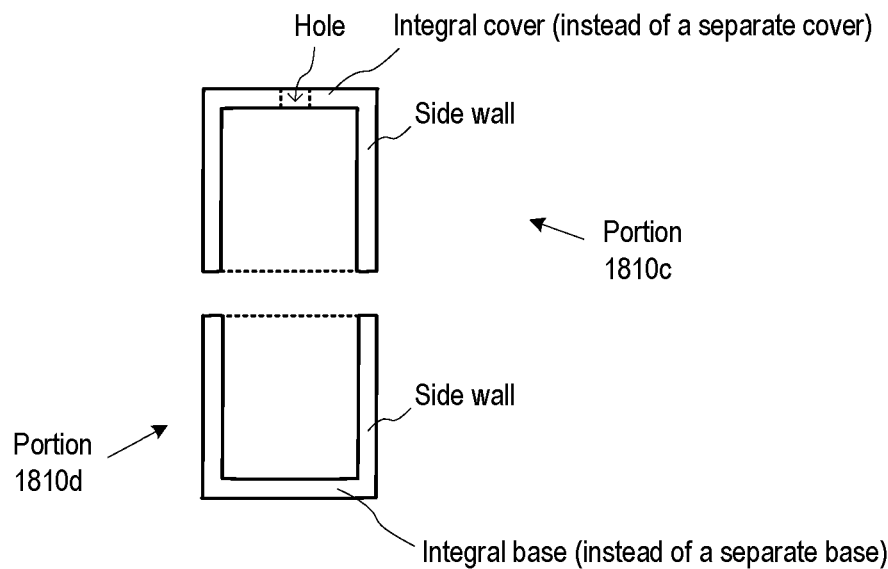

FIG. 18C and FIG. 18D depict perspective and cross-section side views of a design for two horizontally cut reservoir housing portions 1810*c* and 1810*d* that respectively include an integral cover and an integral base. A first portion (e.g., portion 1810*c*) has an integral cover with a hole to receive the piston shaft, and can accommodate airflow valves (if they are placed on the cover). The integral cover spans between the enclosed side wall(s) of that portion (e.g., from inner surfaces of the side walls or from outer surfaces of the side walls). The enclosed side wall(s) may include a circular side wall of a cylindrical reservoir housing, four side walls of a rectangular reservoir housing, or another set of walls for other volumes. The second portion (e.g., 1810*d*) has an integral base that spans between enclosed side wall of that portion. In one set of embodiments, the integral base is omitted. In one set of embodiments, the integral cover is omitted. Gaskets can be placed on any mating surfaces of the portions 1810*c* and 1810*d* that abut each other to create a seal. Coupling of the portions 1810*c* and 1810*d* can be by way of coupling means described herein—e.g., snap fit, tab and slot, fastener, or other. In some embodiments, another component couples the portions together—e.g., a coupler or another suitable component.

FIG. 19 compares storage profiles for (i) a typical air pump that is not meant to be disassembled, (ii) a disassembled air pump that includes vertically cut reservoir housing portions and horizontally cut piston shaft portions, (iii) a disassembled air pump that includes horizontally cut reservoir housing portions and horizontally cut piston shaft portions, and (iv) an disassembled air pump that includes telescoping reservoir housing portions and horizontally cut piston shaft portions. The storage length of the typical air pump is longer than the storage lengths of the disassembled air pumps. The storage length of the disassembled air pump that includes vertically cut reservoir housing portions is longer than the storage lengths of the disassembled air pumps that include horizontally cut reservoir housing portions or telescoping reservoir housing portions. The disassembled air pump that includes vertically cut reservoir housing portions can be stored more tightly than the disassembled air pumps that include horizontally cut reservoir housing portions or telescoping reservoir housing portions. The disassembled air pump that includes horizontally cut reservoir housing portions cannot be stored as tightly as the disassembled air pump that includes telescoping reservoir housing portions. However, each disassembled air pump has unique storage capabilities that give them different advantages.

The invention claimed is:

1. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more reservoir housing portions of the reservoir housing include at least two vertically cut reservoir housing portions.

2. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more reservoir housing portions of the reservoir housing include at least two horizontally cut reservoir housing portions.

3. The air pump of claim 2, further comprising:
   a coupler that (i) couples to a bottom end of a first horizontally cut reservoir housing portion and a top end of a second horizontally cut reservoir housing portion in the assembled configuration, and (ii) decouples from the bottom end of the first horizontally cut reservoir housing portion and decouples from the top end of the second horizontally cut reservoir housing portion in the disassembled configuration.

4. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more portions of the reservoir housing include a first set of vertically cut portions from a first horizontally cut part of the reservoir housing, and a second set of vertically cut portions from a second horizontally cut part of the reservoir housing.

5. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more portions of the reservoir housing include at least two angularly cut reservoir housing portions.

6. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more portions of the reservoir housing include a first vertically cut reservoir housing portion and a second vertically cut reservoir housing portion, wherein the first vertically cut reservoir housing portion includes an integral cover that spans between side walls of the first and second reservoir housing portions.

7. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more portions of the reservoir housing include a first horizontally cut reservoir housing portion and a second horizontally cut reservoir housing portion, wherein the first horizontally cut reservoir housing portion includes an integral cover.

8. An air pump having an assembled configuration and a disassembled configuration, wherein the air pump comprises:
   a reservoir housing that comprises two or more reservoir housing portions that (i) couple together when the air pump is in the assembled configuration and (ii) decouple from each other when the air pump is in the disassembled configuration;
   a piston shaft; and
   a piston,
   wherein the two or more portions of the reservoir housing include at least two telescoping reservoir housing portions.

9. The air pump of claim 8, wherein the at least two telescoping reservoir housing portions couple to each other in the assembled configuration using compatible male threading and female threading.

10. The air pump of claim 8, wherein the piston is deformable to a first shape when in a first reservoir housing portion of the at least two telescoping reservoir housing portions, and further deformable to a second shape when in a second reservoir housing portion of the at least two telescoping reservoir housing portions.

* * * * *